(12) United States Patent
Jo

(10) Patent No.: US 8,281,251 B2
(45) Date of Patent: Oct. 2, 2012

(54) APPARATUS AND METHOD FOR INPUTTING CHARACTERS/NUMERALS FOR COMMUNICATION TERMINAL

(75) Inventor: Won-Hyong Jo, Seoul (KR)

(73) Assignee: Zacod Co., Ltd, Seoul (KR)

( * ) Notice: Subject to any disclaimer, the term of this patent is extended or adjusted under 35 U.S.C. 154(b) by 339 days.

(21) Appl. No.: 12/734,294

(22) PCT Filed: Oct. 15, 2008

(86) PCT No.: PCT/KR2008/006067
§ 371 (c)(1),
(2), (4) Date: Apr. 22, 2010

(87) PCT Pub. No.: WO2009/054642
PCT Pub. Date: Apr. 30, 2009

(65) Prior Publication Data
US 2010/0259484 A1    Oct. 14, 2010

(30) Foreign Application Priority Data
Oct. 27, 2007    (KR) .................. 10-2007-0108595

(51) Int. Cl.
*G06F 3/048* (2006.01)
*G06F 3/02* (2006.01)

(52) U.S. Cl. ........ 715/771; 715/773; 715/864; 345/168; 345/173

(58) Field of Classification Search .................. 715/771, 715/773, 864; 455/575.1, 575.4; 345/168, 345/171–173
See application file for complete search history.

(56) References Cited

U.S. PATENT DOCUMENTS

| 7,561,902 | B2 * | 7/2009 | Jo .............................. 455/575.1 |
| 7,768,501 | B1 * | 8/2010 | Maddalozzo et al. ........ 345/173 |
| 2005/0162402 | A1 * | 7/2005 | Watanachote ................ 345/173 |
| 2008/0201768 | A1 * | 8/2008 | Koo et al. .......................... 726/6 |
| 2008/0225006 | A1 * | 9/2008 | Ennadi ......................... 345/171 |
| 2008/0316180 | A1 * | 12/2008 | Carmody et al. ............. 345/172 |

FOREIGN PATENT DOCUMENTS

| KR | 1020010110312 | 12/2001 |
| KR | 1020030080315 | 10/2003 |
| KR | 1020050008299 | 1/2005 |
| KR | 1020050056277 | 6/2005 |

* cited by examiner

*Primary Examiner* — Tadeese Hailu
(74) *Attorney, Agent, or Firm* — R. Neil Sudol; Coleman Sudol Sapone P.C.

(57) ABSTRACT

An apparatus and method for inputting characters/numerals for a communication terminal provided with a touch part is disclosed. A plurality of blocks are formed on a block main body in a touch screen keyboard of the touch part, through which designation of coordinates or selection of characters can be performed using a finger or a tool, for communications with an outside or data storage, and consonants of characters for each language are arranged on the respective blocks while vowels are arranged on a plurality of fixed blocks in at least four directions (e.g. upward, downward, left, right, and diagonal directions) in which the block main body moves. In the case of Korean (i.e. Hangeul) keyboard, Roman character keyboard, and Japanese keyboard, consonants are inputted by touching the respective blocks on the block main body, and vowels of the fixed blocks are inputted through manipulation of the block main body that moves in at least four directions.

21 Claims, 15 Drawing Sheets

Fig. 5
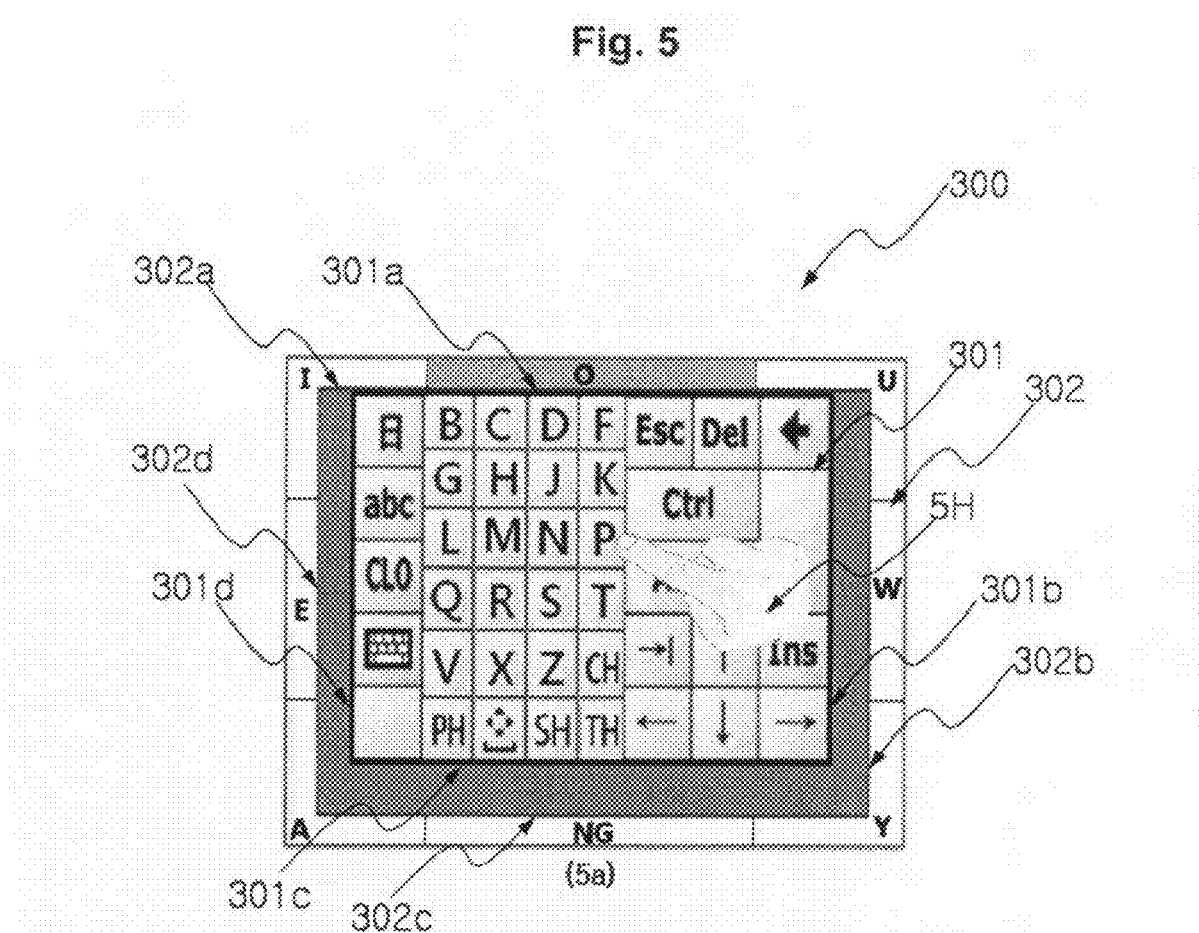
(5a)
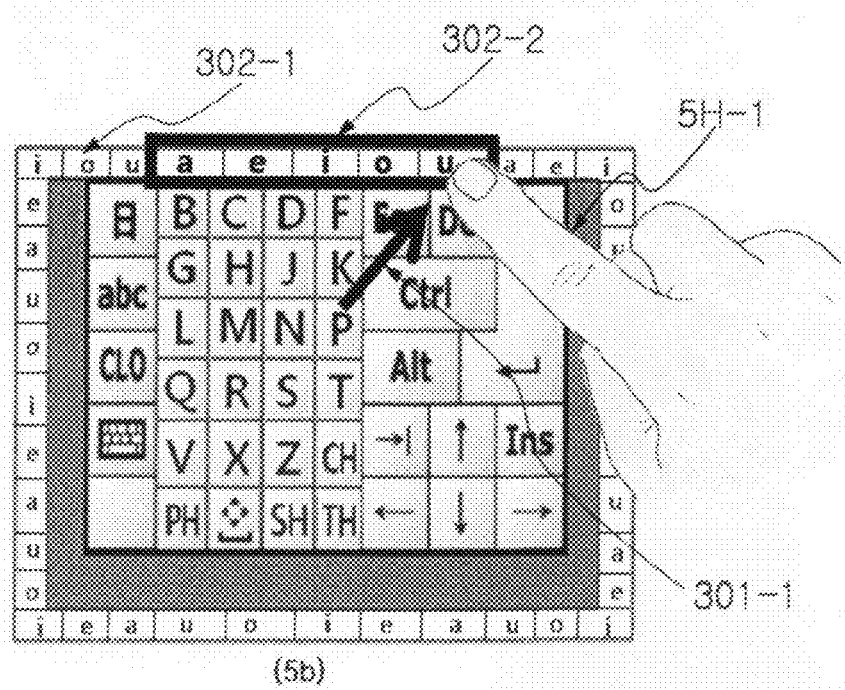
(5b)

| Example of stationary block input after manipulation of block |||||||||||
|---|---|---|---|---|---|---|---|---|---|---|
| | Block あgyo | Stationary Block (Small Letter) | Block かgyo | Stationary Block (Small Letter) | Block さgyo | Stationary Block (Small Letter) | Block たgyo | Stationary Block (Small Letter) | Stationary Block (Interval Geminate) | Block なgyo |
| あdan 1 dan | あ | ぁ | か | が | さ | ざ | た | だ | | な |
| Example of activated stationary block input after manipulation of block and stationary block |||||||||||
| | Stationary Block あgyo | Activated Stationary Block (Small Letter) | Stationary Block かgyo | Activated Stationary Block (Sonant) | Stationary Block さgyo | Activated Stationary Block (Sonant) | Stationary Block たgyo | Activated Stationary Block (Sonant) | Activated Stationary Block (Interval Geminate) | Stationary Block なgyo |
| いdan 2 dan | い | ぃ | き | ぎ | し | じ | ち | ぢ | | に |
| うdan 3 dan | う | ぅ | く | ぐ | す | ず | つ | づ | っ | ぬ |
| えdan 4 dan | え | ぇ | け | げ | せ | ぜ | て | で | | ね |
| おdan 5 dan | お | ぉ | こ | ご | そ | ぞ | と | ど | | の |

| | Block は gyo | Stationary Block (Sonant) | Stationary Block (Semi-Sonant) | Block ま gyo | Block や gyo | Stationary Block (Small Letter) | Block ら gyo | Block わ gyo | Stationary Block (Small Letter) |
|---|---|---|---|---|---|---|---|---|---|
| Example of stationary block input after manipulation of block ||||||||||
| あ dan 1 dan | は | ば | ぱ | ま | や | ゃ | ら | わ | ゎ |
| Example of activated stationary block input after manipulation of block and stationary block ||||||||||
| | Stationary Block は gyo | Activated Stationary Block (Sonant) | Activated Stationary Block (Semi-Sonant) | Stationary Block ま gyo | Stationary Block や gyo | Activated Stationary Block (Small Letter) | Stationary Block ら gyo | Stationary Block わ gyo | Activated Stationary Block (Small Letter) |
| い dan 2 dan | ひ | び | ぴ | み | | | り | | |
| う dan 3 dan | ふ | ぶ | ぷ | む | ゆ | ゅ | る | ん | |
| え dan 4 dan | へ | べ | ぺ | め | | | れ | | |
| お dan 5 dan | ほ | ぼ | ぽ | も | よ | ょ | ろ | を | |

APPARATUS AND METHOD FOR INPUTTING CHARACTERS/NUMERALS FOR COMMUNICATION TERMINAL

TECHNICAL FIELD

The present invention relates to an apparatus and method for inputting characters/numerals. More particularly, the present invention relates to an apparatus and method for inputting characters/numerals for a communication terminal, in which a block body having various blocks can be moved in at least four directions based on a center thereof to conveniently input the characters/numerals.

BACKGROUND ART

Human centric interface (HCI) means a human-oriented interface, and includes all technologies belonging to a human interface that makes a human-machine interface natural as a human-human interface. Recently, information terminals are diversified into not only cellular phones, notebook computers, and PCs but also MP3 players, PDA, and the like, and one appliance provides bidirectional functions of the cellular phone, PDA, MP3 player, camera, and the like. The importance of the user-oriented interface becomes greater.

In the year 2000, starting a new thousand years, human interface technology has been once selected as one of 10 important technologies for future 10 years.

The human interface technology is not independently provided, but is included in diverse products. Since the HCI field is a user interface field, it is required to easily and quickly provide an interface desired by users. The human interface may be a field that reflects the client's inclination rather than the technology itself. Therefore, the human interface is a field to hold an ear to opinions of not only engineers, but also marketers, psychologists, designers, and consumers.

Currently, technology of an input device in a portable terminal has been developed with some features. As popular cellular phones employ a 3×4 keypad, each manufacturer develops new mechanical material and electrically contact manner while maintaining discrimination by using an input method having a native trademark by company. With the trend of slim cellular phones, cellular phone manufacturers prefer TACT switches as contacts in keypads since consumers are long familiar with keypads.

Consumers are get used to send a short message, retrieve Internet sites or send an e-mail by using the input mode employed by the cellular phone manufactures. Since there is little difference between the number of input types and input speed, the consumers do not feel the convenience and discrimination. The cellular phone manufactures hold character input meetings not to attract attention to a business, but to promote its brand power.

In the case of smart phones that are gradually spread in the market in trademarks of Black Jack (Samsung Electronics), enV (LG Electronics), Q (Motorola), mylo (Sony), and the like, QWERTY keyboards are employed as input devices of the smart phones.

At present, the QWERTY keyboard is the fastest input device among the currently developed input devices, and the manufacturers prefer to select this type of input device.

However, keys provided on the smart phones are relatively small, and thus disturbs the key input speed. Accordingly, with the current tendencies in complexity with PMP, navigation, DMB, and the like, some smart phones adopt keyboards installed in touch screens by software.

Touch screen technology has been developed around PDA terminals, and includes an input system sensing a resistance value of a finger and an input system sensing a capacitance value between contact surfaces. Recently developed touch screen character input apparatuses and methods somewhat make up for the existing problems, but require complicated manipulation with a finger or a tool and accuracy to cause users to have severe fatigue. These apparatuses and methods also have the problem that the size of buttons is too small for the users to input them with their fingers.

Accordingly, it is not considered that the recently developed touch screen character input apparatuses and methods greatly improve the existing inconvenience, and thus terminal manufacturers cannot easily determine their production. Nevertheless, application of such touch screen input devices to high-class cellular phones and some smart phones has been gradually spread.

Since it is very important to overcome the limits of displays and input systems for their functions as multimedia devices truly desired by users, the roles of useful touch screen character input methods and apparatuses have become much greater.

DISCLOSURE

Technical Problem

Accordingly, the present invention has been made to solve the above-mentioned problems occurring in the prior art while advantages achieved by the prior art are maintained intact.

An object of the present invention is to provide an apparatus and method for inputting characters/numerals for a communication terminal, in which a block body having a plurality of blocks provided on a touch screen keyboard of a touch part can be moved in at least four directions to conveniently input a character/numeral by language using the communication terminal.

Another object of the present invention is an apparatus and method for inputting characters/numerals for a communication terminal, which can make it possible to input two phonemes at maximum through a user's once manipulation and thus can remarkably increase an input speed of characters/numerals by arranging consonants and vowels on a plurality of stationary (or fixed) blocks around a block body which can be moved in at least four directions, and each block in a touch part.

Technical Solution

In order to achieve the above and other objects, there is provided an apparatus for inputting characters/numerals for a communication terminal provided with a touch screen keyboard on a touch part, through which designation of coordinates or selection of characters can be performed using a finger or a tool for communications with an outside or data storage, according to the present invention, which includes a block body positioned in the touch screen keyboard for generating a manipulation signal of a stationary block in accordance with a block manipulation of a user who desires a character/numeral input or a moving manipulation in at least four directions based on a center of a user, the block body including a plurality of blocks and a plurality of closed sectors of the stationary block positioned in at least four directions, in which the block body is moved, being allocated with consonants, vowels, numerals, symbols, and function keys by languages including Hangeul, Roman characters, and Japanese;

a character storage unit storing character data by languages used in the character input apparatus; a program memory storing an inner operating program of the communication terminal; a code storage unit storing code data corresponding to the blocks provided on the block body and the stationary block positioned on an outside of the block body; a block manipulation recognition unit detecting a touch manipulation state of each block provided on the block body; a stationary block recognition unit detecting a manipulation state of the stationary block in accordance with a moving manipulation of the block body in at least four directions; a microprocessor judging of which language a user inputs a phoneme with reference to the character data stored in the character storage unit in accordance with the operating program stored in the program memory when a touch manipulation state detection signal is inputted through the block or stationary block manipulation recognition unit, and generating and outputting a display control signal for displaying phonemes of the corresponding language inputted by the user with reference to the code data stored in the code storage unit; a display drive unit outputting a drive control signal for displaying the character and numeral selected by the user through manipulation of the stationary block in accordance with the moving manipulation of the block body or the block on the block body, in accordance with the display control signal outputted from the microprocessor; and a display unit displaying the character and the numeral in accordance with the drive control signal outputted from the display drive unit; wherein the stationary block and the block body are logically implemented and are displayed on the touch part of the touch screen.

In another aspect of the present invention, there is provided a method for inputting characters/numerals for a communication terminal, which includes (1) a microprocessor of the communication terminal judging whether a user selects a character mode corresponding to a language; (2) the microprocessor judging which mode of a Hangeul input mode, Roman character input mode, and a Japanese character input mode the user selects; (3) if the user selects the Hangeul input mode, the microprocessor detecting a manipulation signal of a stationary block in accordance with a user's manipulation of a plurality of blocks provided on a block body or a block body moving manipulation in upper, lower, left, right, and diagonal directions, inputted from a block manipulation recognition unit and/or a stationary block manipulation recognition unit, combining a consonant and a vowel of a corresponding Hangeul and a numeral/symbol, and displaying a corresponding Hangeul and numeral/symbol on a display screen of the communication terminal; (4) if the user selects the Roman character input mode, the microprocessor detecting a manipulation signal of a stationary block in accordance with a user's manipulation of a plurality of blocks provided on a block body or a block body moving manipulation in upper, lower, left, right, and diagonal directions, inputted from a block manipulation recognition unit and/or a stationary block manipulation recognition unit, combining a consonant and a vowel of a corresponding Roman character and a numeral/symbol, and displaying a corresponding Roman character and numeral/symbol on a display screen of the communication terminal; (5) if the user selects the Japanese input mode, the microprocessor detecting a manipulation signal of a stationary block in accordance with a user's manipulation of a plurality of blocks provided on a block body or a block body moving manipulation in upper, lower, left, right, and diagonal directions, inputted from a block manipulation recognition unit and/or a stationary block manipulation recognition unit, combining hiragana, katakana, a Chinese character and a numeral/symbol, and displaying it on a display screen of the communication terminal; (6) if a character input work through any one input mode selected among the Hangeul input mode, the Roman character input mode, and the Japanese input mode is finished, the microprocessor of the communication terminal judging whether the user selects a character storage and storing the character inputted by the user; and (7) the microprocessor of the communication terminal judging whether the user ends the character mode, and continuing or removing the character mode.

Advantageous Effects

As described above, according to the apparatus and method for inputting characters/numerals for a communication terminal according to the present invention, consonants/vowels of characters are arranged on the respective blocks and stationary blocks on the block body on the touch part provided in the communication terminal so that a user can be well acquainted with such an arrangement. Accordingly, the input of characters and numerals/symbols for each language can be conveniently made with a plurality of active blocks that are generated by touch signals on the respective blocks, and a user can promptly and conveniently input various kinds of characters/numerals of Hangeul, Roman characters, and Japanese with a smaller number of inputs or manipulations than the communication terminal provided with the existing touch screen type keyboard, so that the apparatus and method according to the present invention can contribute to the substantial spread of communication terminals adopting touch screen key input devices. Also, since the apparatus and method according to the present invention makes it possible to input characters/numerals more promptly and conveniently, it is effective in implementing document works, e-mail, chatting, Internet information search, and the like.

BRIEF DESCRIPTION OF THE DRAWINGS

The foregoing and other objects, features and advantages of the present invention will become more apparent from the following detailed description when taken in conjunction with the accompanying drawings in which:

FIGS. 5A and 5B are views illustrating examples of a Roman character keyboard of a character/numeral input device for a communication terminal according to an embodiment of the present invention;

FIGS. 7A and 7B are tables showing hiragana/katakana of Japanese made in accordance with manipulation of blocks and a stationary block on a Japanese keyboard of a character/ numeral input device for a communication terminal according to an embodiment of the present invention;

Figure 8:
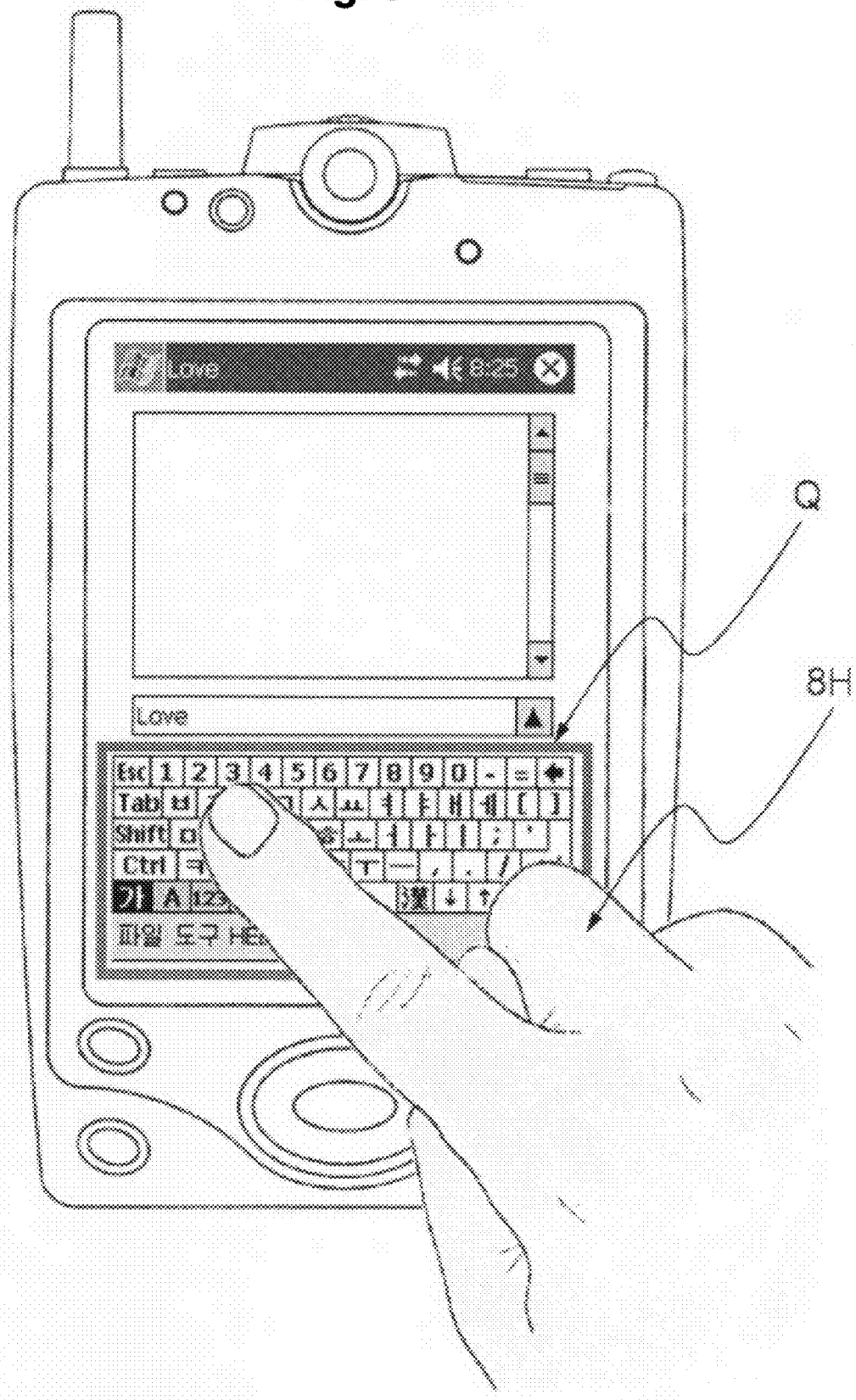
Figure 9:
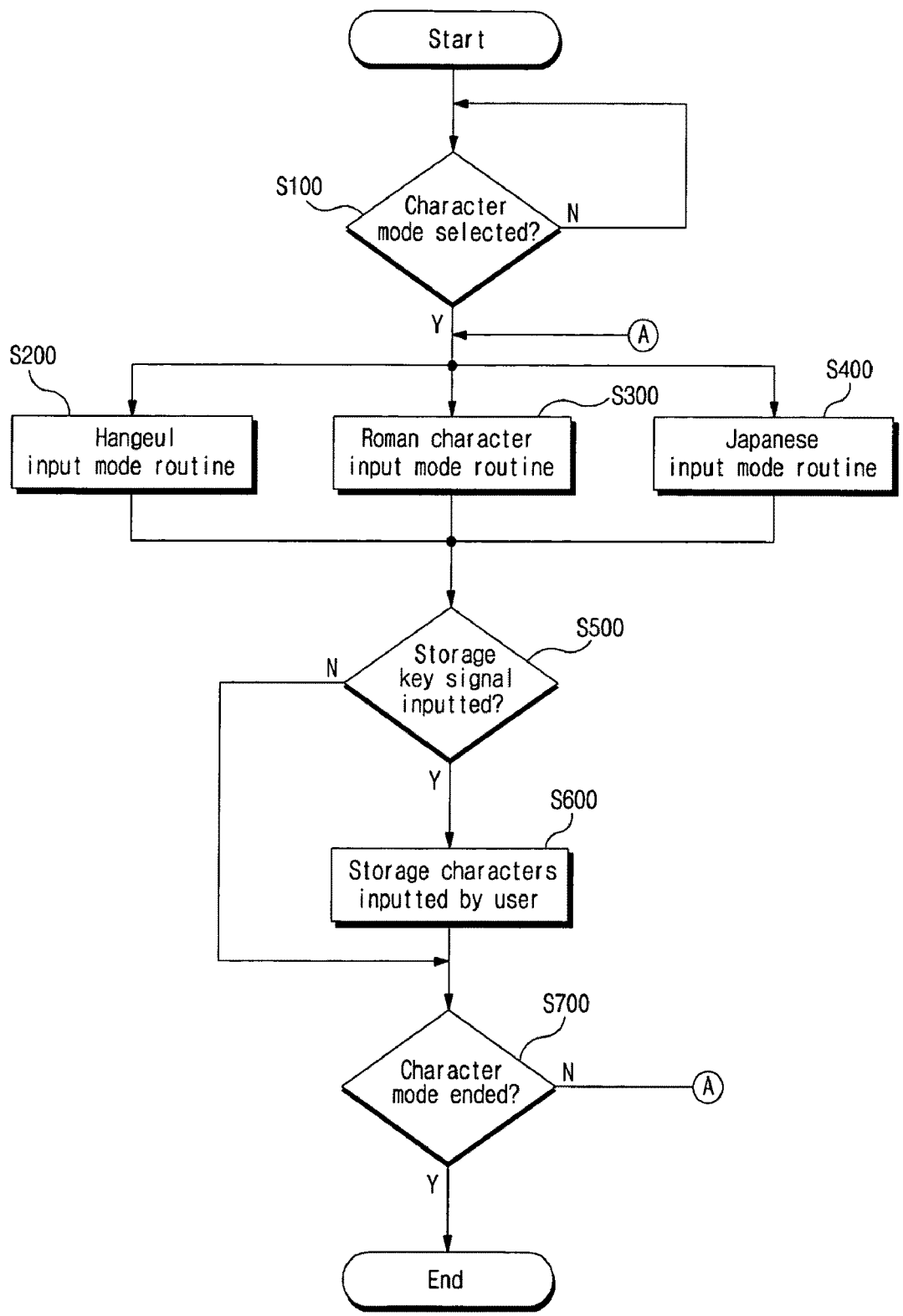
Figure 10:
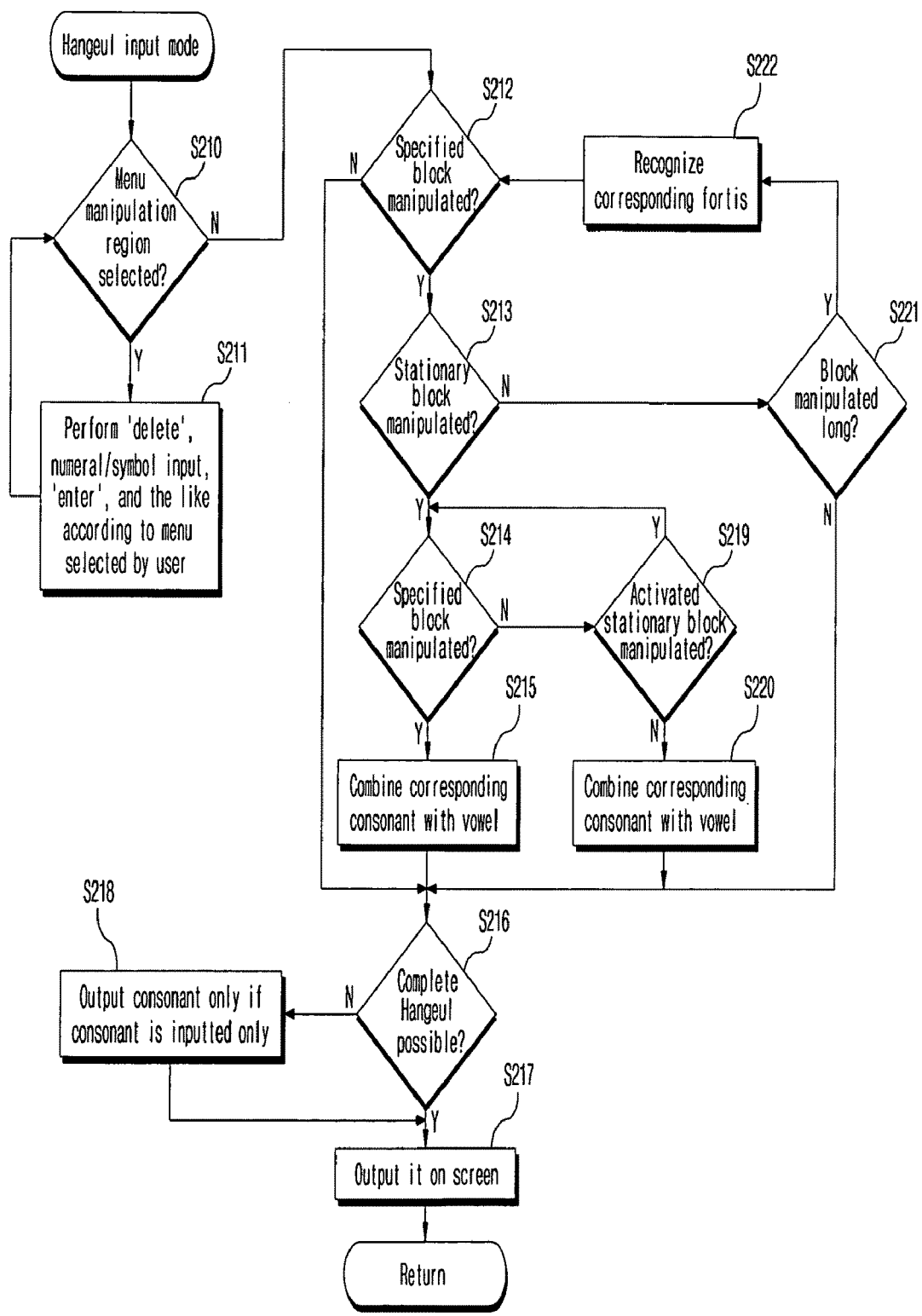
Figure 11:
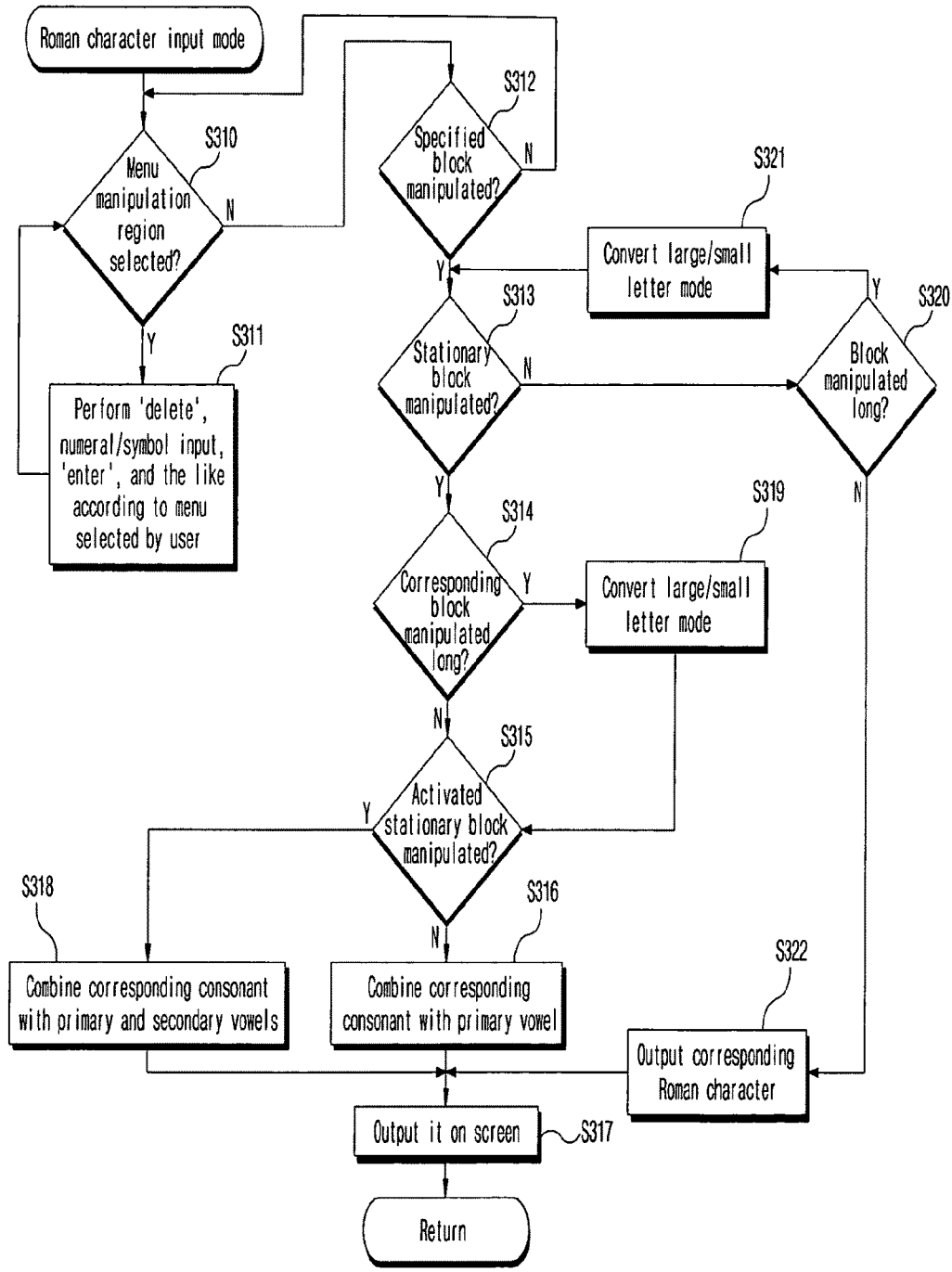
Figure 12:
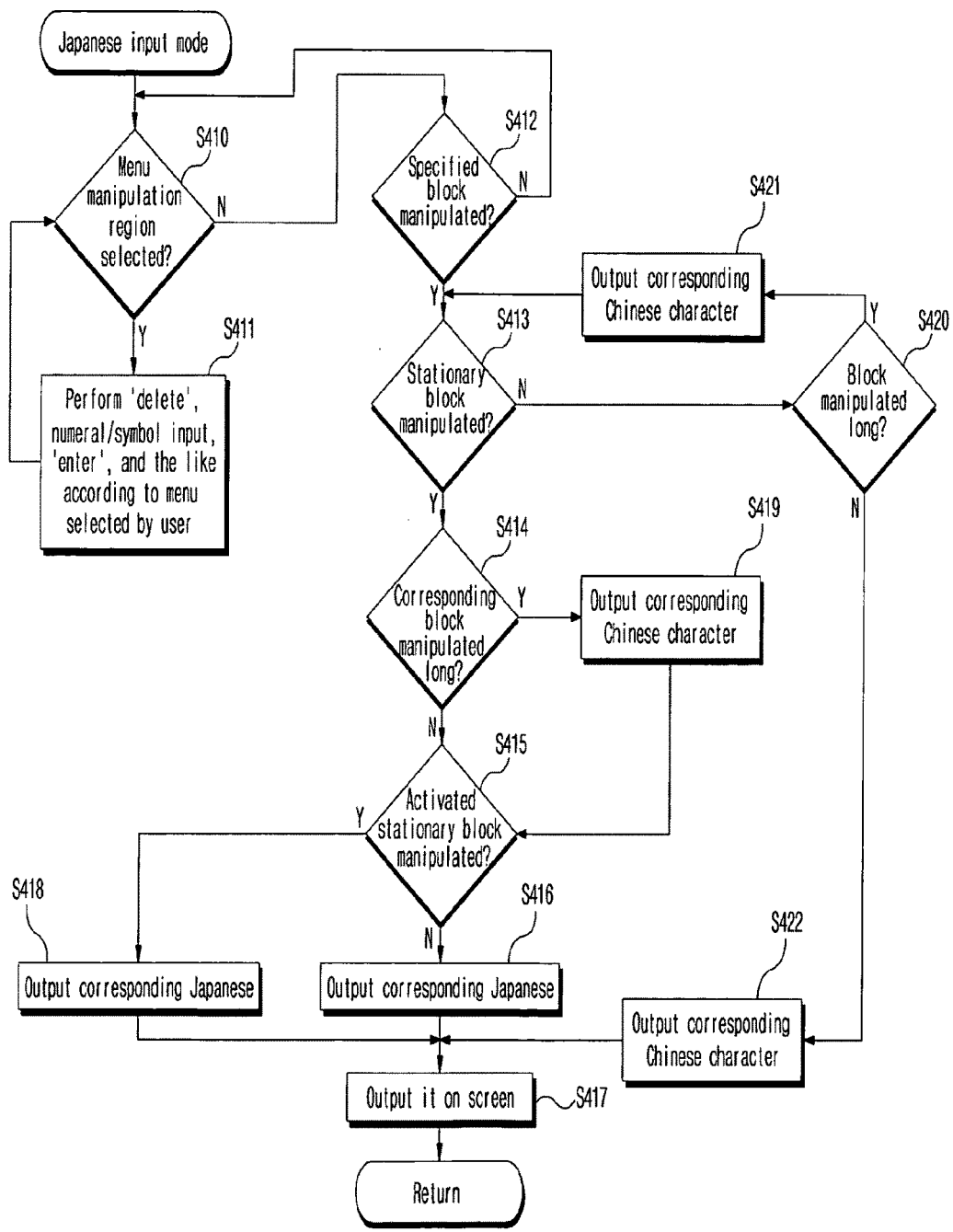

FIG. 8 is a view schematically illustrating a structure of a touch screen keyboard for an existing communication terminal;

FIG. 9 is a flowchart illustrating a character/numeral input process of a communication terminal according to an embodiment of the present invention;

FIG. 10 is a flowchart illustrating detailed processes of a Hangeul input mode routine in FIG. 9;

FIG. 11 is a flowchart illustrating detailed processes of a Roman character input mode routine in FIG. 9; and FIG. 12 is a flowchart illustrating detailed processes of a Japanese input mode routine in FIG. 19.

FIGS. 13A to 13D are views illustrating using states of a Japanese keyboard of a character/numeral input device for a communication device according to an embodiment of the present invention.

BEST MODE

Hereinafter, an apparatus and method for inputting characters/numerals for a communication terminal according to the preferred embodiments of the present invention will be described in detail with reference to the accompanying drawings.

Figure 1:
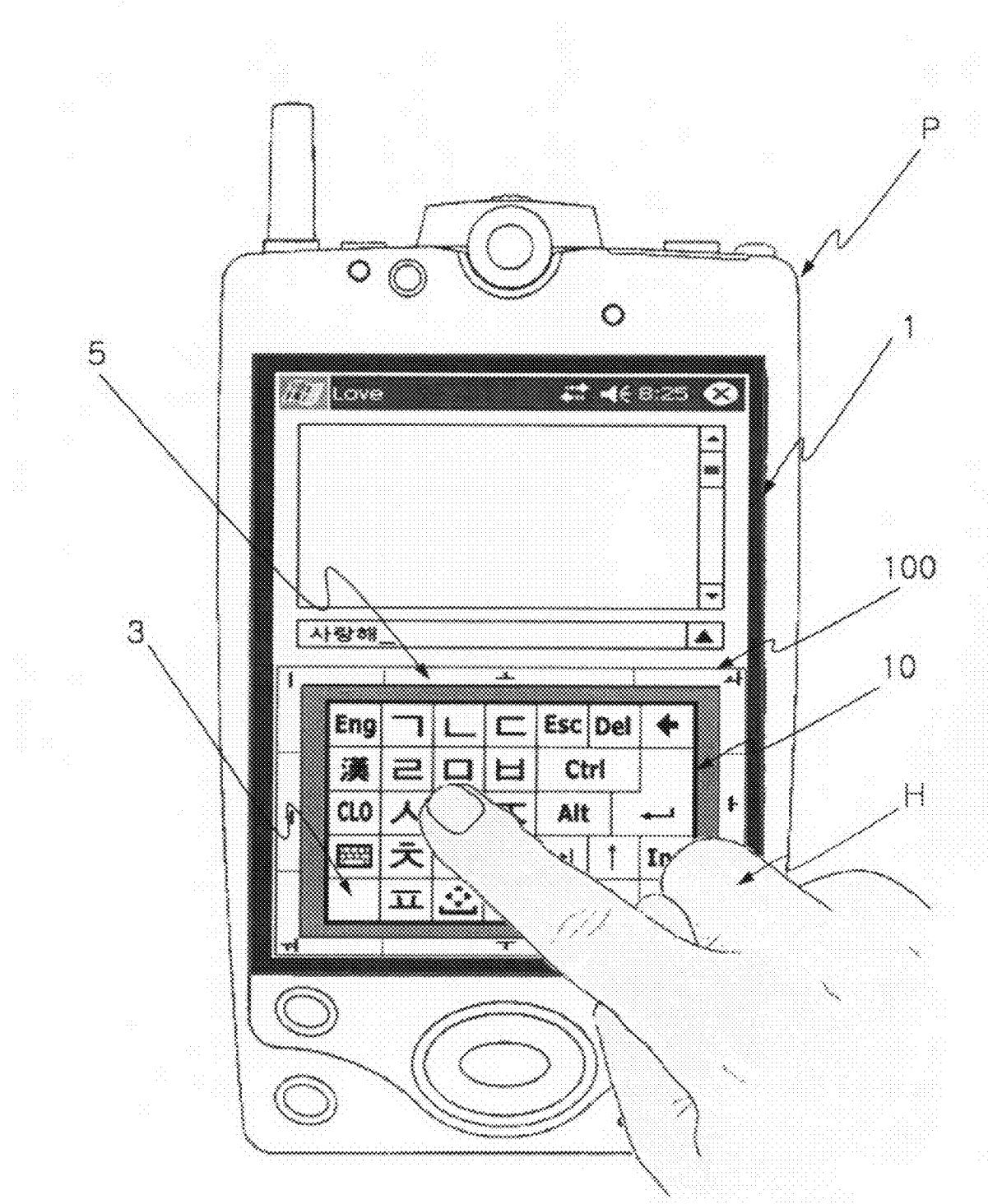
FIG. 1 is a view schematically illustrating the structure of a communication terminal according to an embodiment of the present invention.
Figure 2:
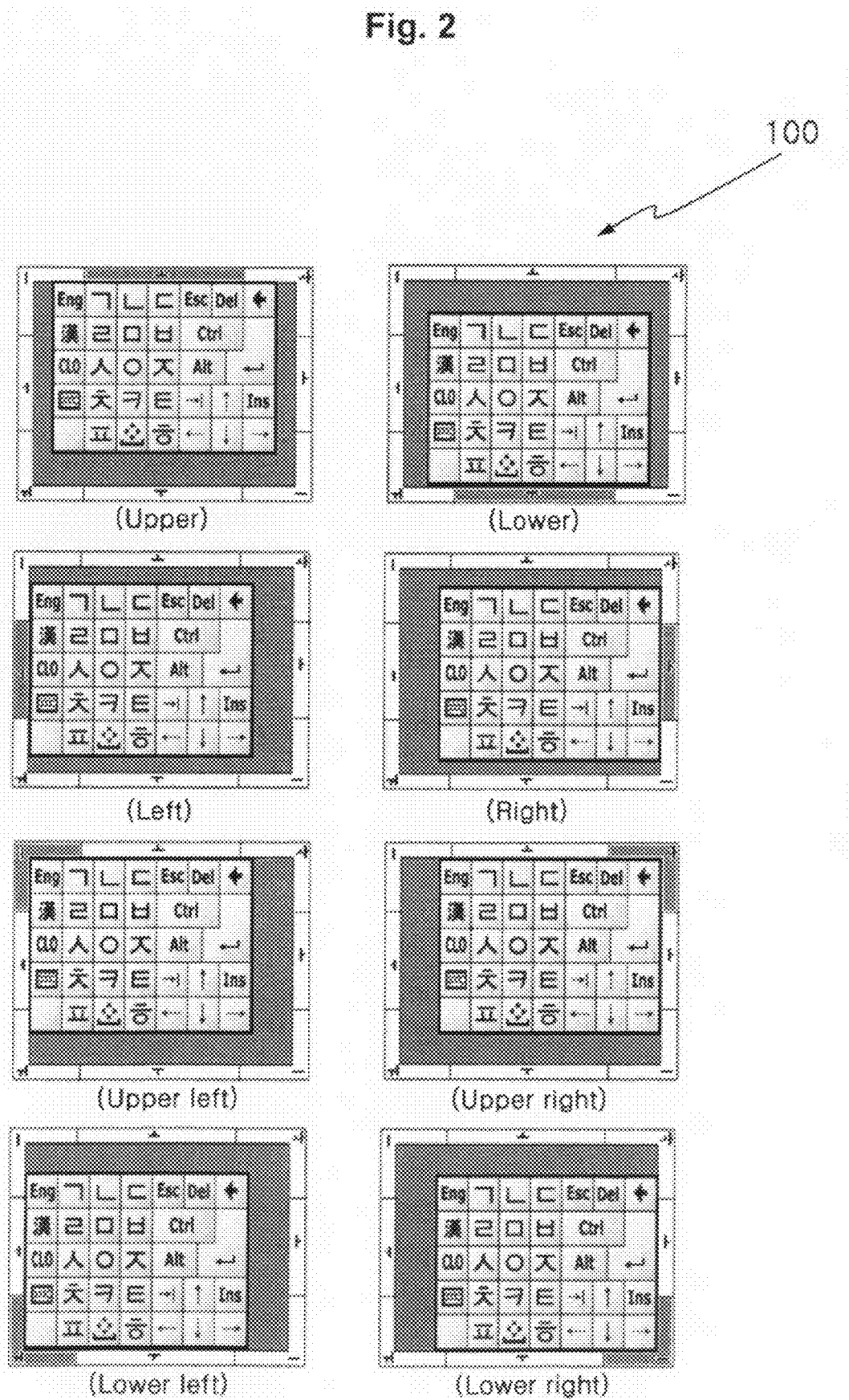
FIG. 2 is a view explaining the operation of a touch screen keyboard for a communication terminal according to an embodiment of the present invention.
Figure 3:
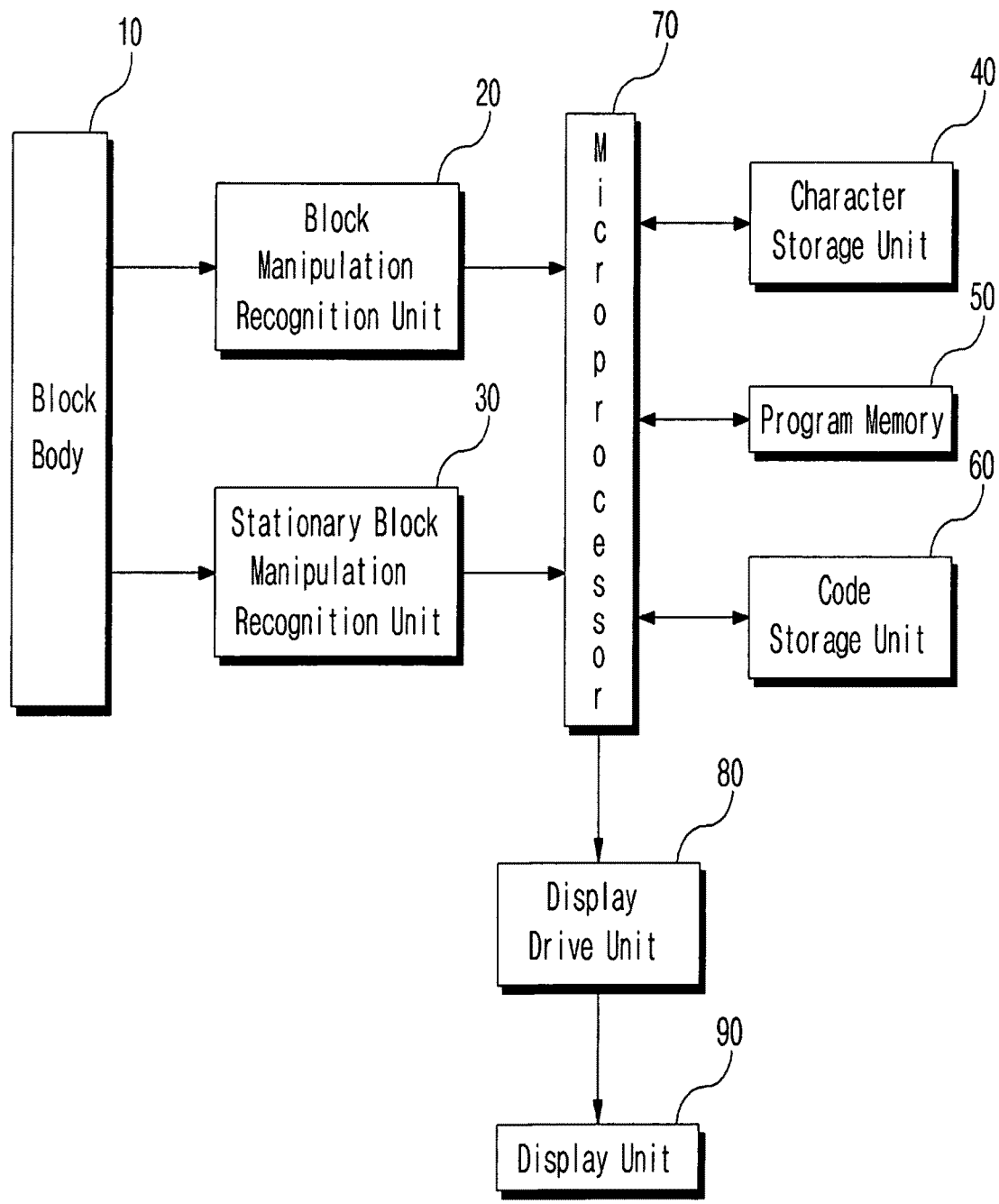
FIG. 3 is a block diagram schematically illustrating the structure of a character/numeral input device for a communication terminal according to an embodiment of the present invention.

FIG. 1 is a view schematically illustrating the structure of a communication terminal according to an embodiment of the present invention. FIG. 2 is a view explaining the operation of a touch screen keyboard 100 for a communication terminal according to an embodiment of the present invention. FIG. 3 is a block diagram illustrating the construction of a character/numeral input device for a communication terminal according to an embodiment of the present invention.

As shown in the drawings, a block body 10 includes a plurality of blocks 3 to input characters of Hangeul (i.e. Korean language), Roman character and Japanese, numerals and special characters. A stationary block 5 includes a plurality of closed sectors to input characters of Hangeul (i.e. Korean language), Roman character and Japanese, and symbols. In accordance with a user's manipulation, the entire block body 10 can be moved in at least four directions, e.g., in upper, lower, left, right and diagonal (upper left, upper right, lower left, and lower right) directions, in the stationary block 5 (see FIG. 2). The block body 10 and the stationary block 5 are not an input device, but a kind of imaginary keypad which can be logically displayed on a touch screen and operated by pressing the input device displayed on the screen by a user. The block body 10 is moved by touch of a user's finger H, as shown in FIG. 1. The user can move the block body in upper, lower, left, right and diagonal directions in the stationary block 5, with his or her finger H touching the block body 10 (see FIG. 2). If the finger H is removed from the block body 10, the block body 10 is returned to its original position, i.e., a center of the touch screen keypad 100. It is of course that the shape and dimension of the block body 10 and stationary block may be varied. The selection, moving and position judgment of the block body 10 employ the widely known technology related to the selection and drag of a figure object to the displayed on the touch screen, the detailed description being omitted herein.

Figure 4:
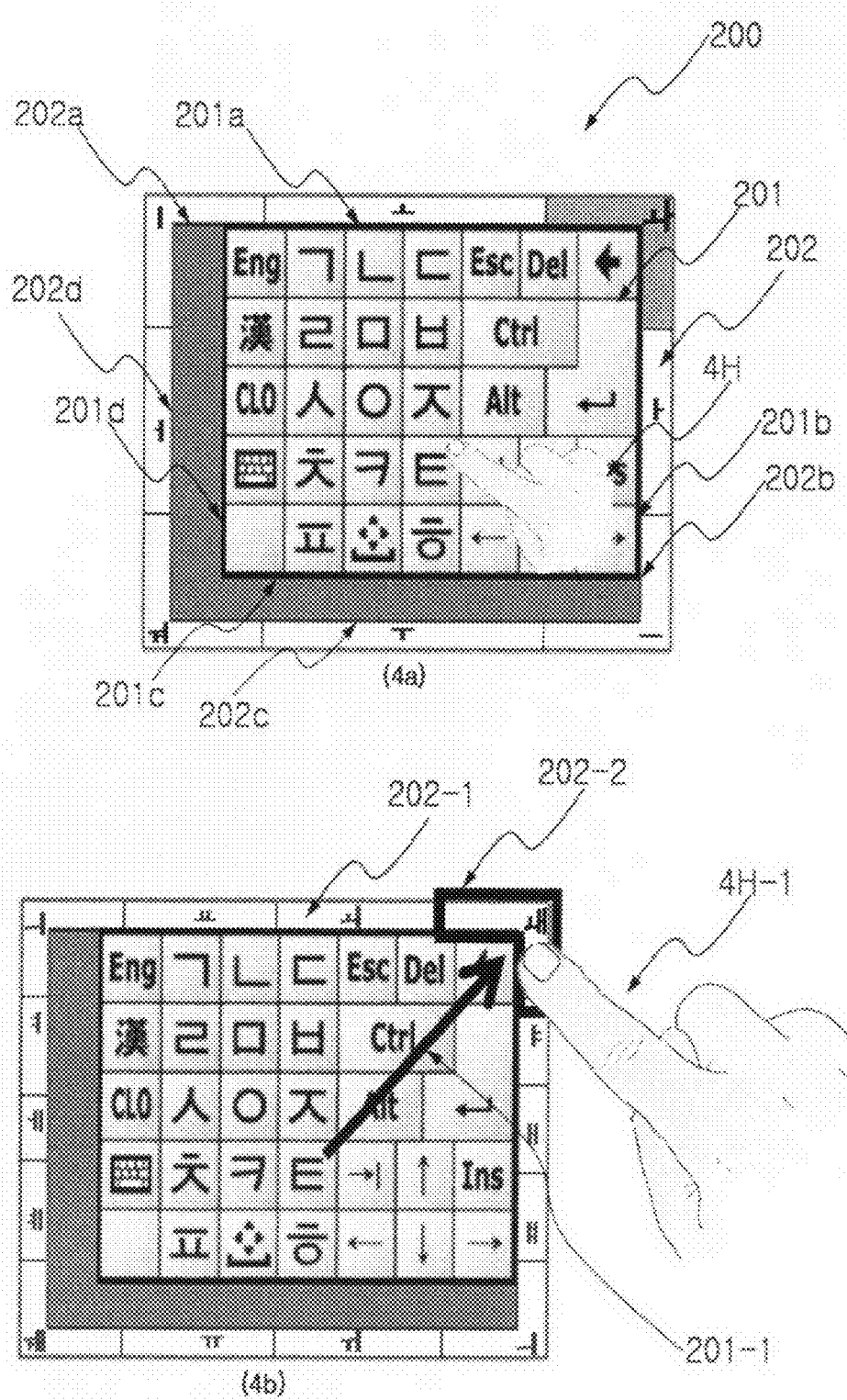
FIGS. 4A and 4B are views illustrating examples of a Hangeul keyboard of a character/numeral input device for a communication terminal according to an embodiment of the present invention.
Figure 6:
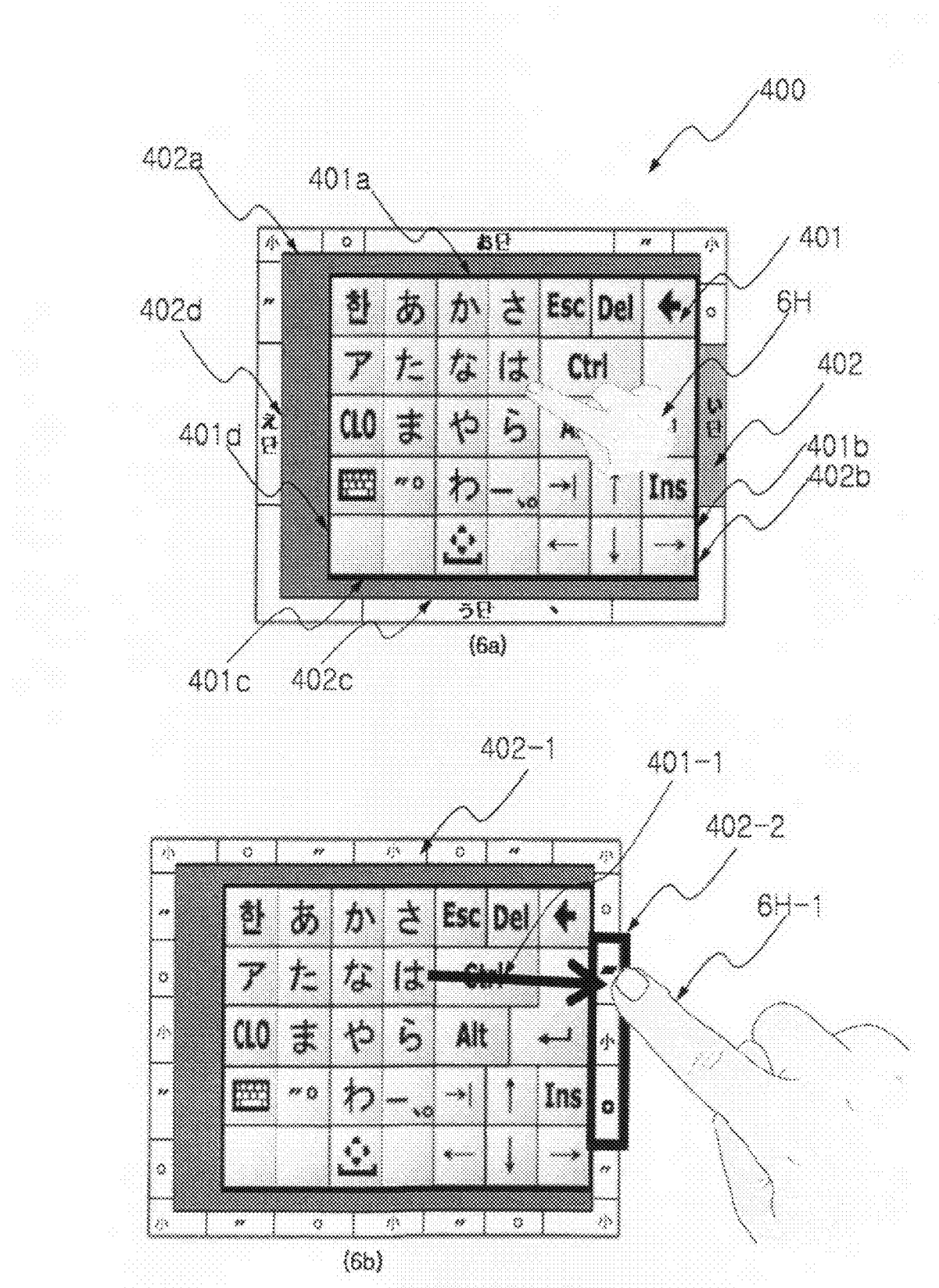
FIGS. 6A and 6B are views illustrating examples of a Japanese keyboard of a character/numeral input device for a communication terminal according to an embodiment of the present invention.

In this instance, each of the blocks 5 and stationary blocks 5 is allocated with a consonant, vowel, numeral and function key of Hangeul, Roman character and Japanese (see FIGS. 4, 5 and 6), and generates a manipulation signal of the stationary block in accordance with the user's manipulation of the block 3 or the moving manipulation in at least four directions in the body P of the communication terminal based on the center of the user to input desired characters/numerals.

When each of the blocks 3 and at least four moving directions on the block body 10 is allocated with a consonant and a vowel by languages of Hangeul, Roman character and Japanese, in the case of the Hangeul keypad 200, each block 3 of the block bodies 1 and 201 is allocated to input a consonant and each closed sector of the stationary blocks 5 and 202 is allocated to input vowels (FIGS. 4A and 4B); in the case of the block body 300 of Roman character, each block 3 of the block bodies and 301 is allocated to input a consonant and each closed sector of the stationary blocks 5 and 302 is allocated to input vowels (FIGS. 5A and 5B); and, in the case of the block body 400 of Japanese, each block 5 and 402 of the block bodies 1 and 401 is allocated to input 'あ'dan (段：だん)of each gyo (行：ぎょう)of Japanese and a character converting signal and each closed sector of the stationary blocks 5 and 402 is allocated to input 'う'dan, 'い'dan, 'え'dan, and 'あ'dan of each gyo of Japanese and other character converting signals (FIGS. 6A and 6B).

Therefore, even with a smaller number of key buttons, a user can perform the function of a PC's keyboard. Since a dimension of the keyboard is increased in comparison with a keyboard Q of a communication terminal for an existing touch screen, it overcomes a character input circumference using a tool which is considered as a cumbersome (see FIG. 8), and characters can be inputted by using a user's finger. In particular, it is possible to conveniently and accurately input characters and/or numerals by using a user's finger in even touch screen Q which has a lowered precision due to its small dimension.

For example, in the case of Hangeul keyboard (FIGS. 4A and 4B), an allocated consonant block of one specified block 5 among the blocks 201 on the block body 10 according to the present invention is freely moved and combined with a vowel allocated to the stationary block 202 to input a character. It is very difficult to input characters by using a general touch screen keyboard Q due to its dimension (see 8H in FIG. 8). In case the existing touch screen keyboard for a communication terminal employing a PC keyboard (FIG. 8), a size of a key button is too small, a user should utilize a tool. Also, in the case where one button is allocated to a plurality of character keys, the number of the buttons can be decreased, and its size is increased by a size of a finger. However, a size of the button is further increased in proportion to the number of the allocated characters in order to allow a finger to select specified characters in the button.

The block manipulation recognition unit 20 detects the touch manipulation of each block 5 provided on the block body 10 to output it to the microprocessor 70.

The stationary block manipulation recognition unit 30 detects a contact state between sides 201 to 201d, 301a to 301d and 401a to 401d of the block body 10 and sides 202a to 202d, 302a to 302d and 402a to 402d of the stationary block 5 in accordance with the moving manipulation of the block body 10 in at least four directions through the touch of the user's finger H to output the result of detection to the microprocessor 70 (see FIGS. 4A, 5A and 6A).

In this instance, the stationary block manipulation recognition unit 30 can detect a face junction state between allocated cells having a desired region defined in an outside of the block body 10 through the allocated cell having a desired region defined in the inside of the stationary block 5, and a position of the allocated cell can be varied depending upon a moving structure of the block body 10.

A character storage unit 40 stores therein characters by languages including Hangeul characters (e.g. complete type characters), Roman characters, and Japanese characters, numerals/symbols, and special characters, and outputs the characters of the corresponding language under the control of the microprocessor 70.

A program memory 50 stores an operating program of the microprocessor 70.

A code storage unit 60 stores code data corresponding to various kinds of touch key blocks T and the second manipulation region 5 arranged on the touch part 10.

The microprocessor 70 judges of which language a user inputs a phoneme with reference to the character data stored in the character storage unit 40 in accordance with the operating program stored in the program memory 50 when a touch state detection signal is inputted through the block manipulation recognition unit and/or the stationary block manipulation region recognition unit 30, and generates and outputs a display control signal for displaying phonemes of the corresponding language inputted by the user with reference to the code data stored in the code storage unit 60.

A display drive unit 80 outputs a drive control signal for displaying characters and numerals selected by the user through a face junction of the block 3 on the block body 10 or the stationary block 5 by a moving manipulation of the block body 10 in accordance with the display control signal outputted from the microprocessor 70.

A display unit 90 is typically composed of an LCD and so on, and displays the characters and numerals on a display screen in accordance with the drive control signal outputted from the display drive unit 80, so that the user can confirm the characters/numerals inputted by the user.

FIGS. 4A and 4B are views illustrating examples of a Hangeul keyboard 200 of a character/numeral input device for a communication terminal according to an embodiment of the present invention. FIG. 4A shows an example of manipulation for implementing a combination of a consonant and a vowel in a method for inputting characters/numerals using a Hangeul keyboard 200 according to an embodiment of the present invention. In FIG. 4A, it is exemplified that '봐'is completed using a block 5 to which 'ㅌ'is allocated. A user moves the block body 201 toward 'ㅗ'allocated to a closed sector in an upper left direction of a stationary block 202 in a state that the user's finger 4H is touching a block 3 to which 'ㅌ'is allocated. At this time, the block body 201 is moved along with the touched finger 4H, and becomes in surface contact with inner sides 202a and 202b of the stationary block 202. In this state, if the user makes his/her finger free from the block body 10, 'ㅌ'and 'ㅗ'are combined to input '봐'and the block body 10 is returned to the center of the touch screen keyboard 100. In order to combine 'ㅌ'with another single vowel, as illustrated in FIG. 2, the user moves the block body 10 in a direction of the closed sector of the stationary block 5 to which the corresponding vowel is allocated in a state that the user's finger 4H touches the block body 10, and after the block body 10 becomes in surface contact with the stationary block 5, the user makes his/her finger free from the block body 10.

As illustrated in FIGS. 2 and 4A, the block body 10 becomes in surface contact with the stationary block in accordance with the moving manipulation of the block body 10 for inputting a character allocated to the stationary block 5. The block body 201, which has been touched by the user's finger 4H, is set to move only to a position where the outer sides 201a-201d of the block body 10 become in surface contact with the inner sides 202a-202d of the stationary block 5. When the surface contact is made, a single vowel allocated to the stationary block 202 and a consonant of the corresponding block 3 are combined to be outputted, and as shown in the activated stationary block 202-1 as illustrated in FIG. 4B, the single vowel allocated to the stationary block 202 is converted into a diphthong to be allocated (See the stationary block in FIG. 4B).

At this time, in order to combine the diphthong, the user performs the touch manipulation by moving 201-1 his/her finger 4H to the activated stationary block 202-1 in a state that his/her finger is kept in a contact state without removing his/her finger from the block. Accordingly, only the user's finger 4H-1 is moved to the stationary block (See FIG. 4B) while the block body 201 stays in the stop position (See FIG. 4A).

In FIG. 4A, it is exemplified that 'ㅌ'is combined with a diphthong 'ㅙ'using the block 5 to which 'ㅌ'is allocated. First, as illustrated in FIG. 4B, in order to input '퇘'the user makes 'ㅗ'converted into 'ㅙ'(See FIG. 4B) by making the block body 201 in surface contact with the stationary block 202 (See FIG. 4A) in a state that the user's finger 4H-1 is touching the block 3 to which 'ㅌ'is allocated, makes his/her finger 4H-1 enter into a closed sector 202-2 to which 'ㅙ'is allocated, and then removes his/her finger from the closed sector 202-2 to input '퇘'(See FIG. 4B).

As illustrated in the drawing, the Hangeul keyboard 200 includes various kinds of function keys. Hangeul consonants are allocated to a plurality of blocks 3 (five rows and three columns), and single vowels of 'ㅣ, ㅗ, ㅛ, ㅓ, ㅏ, ㅕ, ㅜ,and ㅡ'are allocated to a plurality of closed sectors of the stationary block 202 (here, it is exemplified that eight closed sectors are provided in upper left, upper, upper right, left, right, lower left, lower, and lower right directions, respectively).

In the case of the remaining vowels except for the eight vowels allocated to the stationary block 202, as the stationary block 202 is activated 202-1 at a moment where the stationary block becomes in surface contact with the corresponding block body 201 that has been touched by the user's finger, the eight closed sectors are divided into 14 closed blocks to be allocated. The corresponding rule is as follows.

| Position | Stationary Block | Activated Stationary Block |
| --- | --- | --- |
| Upper | Allocated with 'ㅗ' | Divided into 2 closed sectors and allocated with 'ㅛ'and'ㅚ' |
| Lower | Allocated with 'ㅜ' | Divided into 2 closed sectors and allocated with 'ㅠ'and'ㅟ' |
| Left | Allocated with 'ㅓ' | Divided into 3 closed sectors and allocated with 'ㅕ', 'ㅔ', and'ㅖ' |
| Right | Allocated with 'ㅏ' | Divided into 3 closed sectors and allocated with 'ㅑ', 'ㅐ', and'ㅒ' |
| Upper left | Allocated with 'ㅣ' | allocated with 'ㅢ' |
| Upper right | Allocated with 'ㅗ' | allocated with 'ㅙ' |

-continued

| Position | Stationary Block | Activated Stationary Block |
|---|---|---|
| Lower left | Allocated with 'ㅓ' | allocated with 'ㅔ' |
| Lower right | Allocated with 'ㅡ' | allocated with 'ㅢ' |

That is, in the case of a closed sector which is on the left of the stationary block 202 and to which 'ㅏ' is allocated, the closed sector is divided into three sectors when the stationary block 202 is activated 202-1, and 'ㅏ' is converted into 'ㅏ, ㅑ, and ㅐ' to be allocated to the three divided sectors.

In order to display 'ㄱ', the corresponding block 3 is once touched by the user's finger, while in order to display 'ㄲ', the block 3 to which the consonant 'ㄱ' is allocated is touched long, that is, for a specified time, and then the user's finger is removed from the block 3. Also, in order to display a trailing consonant 'ㄼ', the block 3 to which the consonant 'ㄹ' is allocated is once touched, and then the block 3 to which the consonant 'ㅂ' is allocated is once touched to complete the character combination of 'ㄼ'.

On the other hand, in the case where no consonant is manipulated, a single vowel or a diphthong is outputted by performing a moving manipulation in a state that a direction key positioned between 'ㅠ' and 'ㅎ' of the Hangeul keyboard is touched by the user's finger.

Vowels ('ㅣ' and 'ㅢ' in upper left direction, 'ㅝ' and 'ㅞ' in upper right direction, 'ㅓ' and 'ㅔ' in lower left direction, and 'ㅡ' and 'ㅢ' in lower right direction) allocated to closed sectors in diagonal directions of the stationary block 202 are outputted in a manner that if both contact surfaces of the corresponding diagonal line are in a contact state even during 0.1 second (e.g., in the case of outputting 'ㅝ' in the upper right direction, it is required that the contact of the sides 201a and 202a and the contact of the sides 201b and 202b are simultaneously performed) when the block body 201 becomes in surface contact with the stationary block 202, it is recognized as a diagonal vowel, and then the user's finger is removed from the sector to output the corresponding vowel.

Also, in order to control the direction of a cursor displayed on the display unit 90 when the user inputs a character, a direction key positioned between 'ㅠ' and 'ㅎ' of the Hangeul keyboard 200 is used. For example, if the user moves the block body 201 downward in a state that the user's finger is touching the corresponding direction key, and then moves the block body 201 to the right in a state that the user's finger is touching the corresponding direction key, the cursor being displayed on the display unit 90 is moved to the right. In order to move the cursor to a desired position, the user maintains the manipulation state of the corresponding block until the cursor reaches the desired position.

On the other hand, it is preferable that the function keys of the Hangeul keyboard 200 are arranged in consideration of effectiveness.

As described above, in inputting Hangeul, since a consonant and a vowel allocated to the stationary block 5 are combined to prepare a character whenever the user moves the block body 10 in a state that the user's finger touches the corresponding block, the number of inputs is greatly reduced in comparison to the existing method in which a consonant and a vowel are separately inputted, and thus the user's inconvenience in use can be greatly improved.

FIGS. 5A and 5B are views illustrating examples of a Roman character keyboard 300 of a character/numeral input device for a communication terminal according to an embodiment of the present invention. FIG. 5A shows an example of manipulation for implementing a combination of a consonant and a vowel in a method for inputting characters/numerals using a Roman character keyboard 300 according to an embodiment of the present invention. In FIG. 5A, it is exemplified that 'PO' is completed using a block 5 to which 'P' is allocated. A user moves the block body 301 toward 'O' allocated to a closed sector in an upper direction of a stationary block 302 in a state that the user's finger 5H is touching a block 3 to which 'P' is allocated. At this time, the block body 301 is moved along with the touched finger 5H, and becomes in surface contact with an inner side 302a of the stationary block 302. In this state, if the user makes his/her finger free from the block body 10, 'P' and 'O' are combined to input 'PO', and the block body 10 is returned to the center of the touch screen keyboard 100. In order to combine 'P' with another vowel, as illustrated in FIG. 2, the user moves the block body 10 in a direction of the closed sector of the stationary block 5 to which the corresponding vowel is allocated in a state that the user's finger 5H touches the block body 10, and after the block body 10 becomes in surface contact with the stationary block 5, the user makes his/her finger free from the block body 10.

As illustrated in FIGS. 2 and 5A, the block body 10 becomes in surface contact with the stationary block in accordance with the moving manipulation of the block body 10 for inputting a character allocated to the stationary block 5. The block body 301, which has been touched by the user's finger 5H, is set to move only to a position where the outer sides 301a-301d of the block body 10 become in surface contact with the inner sides 302a-302d of the stationary block 5. When the surface contact is made, a vowel allocated to the stationary block 302 and a consonant of the corresponding block 3 are combined to be outputted, and as shown in the activated stationary block 302-1 as illustrated in FIG. 5B, the vowel allocated to the stationary block 302 is converted into a second vowel to be allocated (See the stationary block in FIG. 5B).

At this time, in order to combine the second vowel, the user performs the touch manipulation by moving 301-1 his/her finger to the activated stationary block 302-1 in a state that his/her finger 5H is kept in a contact state without removing his/her finger from the block body. Accordingly, only the user's finger 5H-1 is moved to the stationary block (See FIG. 5B) while the block body 301 stays in the stop position (See FIG. 4B).

In FIG. 5A, it is exemplified that 'P' is combined with a vowel 'O' and a second vowel 'U' using the block 5 to which 'P' is allocated. First, as illustrated in FIG. 5B, in order to input 'POU', the user makes 'O' recognized by making the block body 301 in surface contact with the stationary block 302 to which 'O' is allocated (See FIG. 5A) in a state that the user's finger 5H-1 is touching the block 3 to which 'P' is allocated, and if the stationary block 302 is activated 302-1 to be allocated with 'U' (See FIG. 5B), the user makes his/her finger 5H-1 enter into a closed sector 302-2 to which 'U' of the activated stationary block 302-1 in a state that the user's finger is kept in a touch state, and then removes his/her finger from the closed sector 302-2 to input 'POU' (See FIG. 5B).

As illustrated in the drawing, the Roman character keyboard 300 includes various kinds of function keys. Roman character consonants (e.g. B, C, D, F, G, H, J, K, L, M, N, P, Q, R, S, T, V, X, Z, CH, PH, SH, and TH) are allocated to a plurality of blocks 3 (six rows and four columns), and vowels of 'I, O, U, E, W, A, NG, and Y' are allocated to a plurality of closed sectors of the stationary block 302 (here, it is exemplified that eight closed sectors are provided in upper left, upper, upper right, left, right, lower left, lower, and lower right directions, respectively).

In the case of second vowels allocated when the stationary block 302 is activated, as the stationary block 302 is activated 302-1 at a moment where the stationary block becomes in surface contact with the corresponding block body 301 that has been touched by the user's finger, the eight closed sectors are divided into 40 closed blocks to be allocated. The corresponding rule is as follows.

| Position | Stationary Block | Activated Stationary Block |
|---|---|---|
| Upper | Allocated with 'O' | Divided into 5 closed sectors and allocated with 'A, E, I, O, and U' |
| Lower | Allocated with 'NG' | Divided into 5 closed sectors and allocated with 'A, E, I, O, and U' |
| Left | Allocated with 'E' | Divided into 5 closed sectors and allocated with 'A, E, I, O, and U' |
| Right | Allocated with 'W' | Divided into 5 closed sectors and allocated with 'A, E, I, O, and U' |
| Upper left | Allocated with 'I' | Divided into 5 closed sectors and allocated with 'A, E, I, O, and U' |
| Upper right | Allocated with 'U' | Divided into 5 closed sectors and allocated with 'A, E, I, O, and U' |
| Lower left | Allocated with A | Divided into 5 closed sectors and allocated with A, E, I, O, and U |
| Lower right | Allocated with Y | Divided into 5 closed sectors and allocated with A, E, I, O, and U |

That is, in the case of a closed sector which is on the left of the stationary block 302 and to which 'E' is allocated, the closed sector is divided into five sectors when the stationary block 302 is activated 302-1, and 'E' is converted into 'A, E, I, O, and U' to be allocated to the five divided sectors.

In order to display a consonant 'K', the corresponding block 3 is once touched by the user's finger, while in order to display 'CH, PH, SH, or TH', the corresponding block 3 is once touched by the user's finger. In the case of a 'capital/small letter mode change', the block 3 to which the corresponding consonant or vowel is allocated is touched long, that is, for a specified time, and then the user's finger is removed from the block 3.

On the other hand, in the case where no consonant is manipulated, a vowel and a second vowel are outputted without a consonant by performing a moving manipulation in a state that a direction key positioned between 'PH' and 'SH of the Roman character keyboard is touched by the user's finger.

Vowels ('I' and 'A, E, I, O, and U' in upper left direction, 'U' and 'A, E, I, O, and U' in upper right direction, 'A' and 'A, E, I, O, and U' in lower left direction, and 'Y' and 'A, E, I, O, and U' in lower right direction) allocated to closed sectors in diagonal directions of the stationary block 302 are outputted in a manner that if both contact surfaces of the corresponding diagonal line are in a contact state even during 0.1 second (e.g., in the case of outputting 'U' in the upper right direction, it is required that the contact of the sides 301a and 302a and the contact of the sides 301b and 302b are simultaneously performed) when the block body 301 becomes in surface contact with the stationary block 302, it is recognized as a diagonal vowel, and then the user's finger is removed from the sector to output the corresponding vowel.

Also, in order to control the direction of a cursor displayed on the display unit 90 when the user inputs a character, a direction key positioned between 'PH' and 'SH' of the Roman character keyboard 300 is used. For example, if the user moves the block body 301 downward in a state that the user's finger is touching the corresponding direction key, and then moves the block body 301 to the right in a state that the user's finger is touching the corresponding direction key, the cursor being displayed on the display unit 90 is moved to the right. In order to move the cursor to a desired position, the user maintains the manipulation state of the corresponding block until the cursor reaches the desired position.

On the other hand, it is preferable that the function keys of the Roman character keyboard 300 are arranged in consideration of effectiveness.

As described above, in inputting Roman characters, since a consonant, a vowel allocated to the stationary block 5, and a second vowel are combined to prepare a character whenever the user moves the block body 10 in a state that the user's finger touches the corresponding block, the number of inputs is greatly reduced in comparison to the existing method in which a consonant and a vowel are separately inputted, and thus the user's inconvenience in use can be greatly improved.

FIGS. 6A and 6B are views illustrating examples of a Japanese keyboard 400 of a character/numeral input device for a communication terminal according to an embodiment of the present invention. FIG. 6A shows an example of manipulation for implementing Japanese kana through manipulation of a block body 401 and a stationary block 402 in a method for inputting characters/numerals using a Japanese keyboard 400 according to an embodiment of the present invention. In FIG. 6A, it is exemplified that Japanese characters are completed using a block 5 to which 'は' is allocated. First, if a user remove his/her finger 6H from the block 3 to which 'は' is allocated in a state that the user's finger is touching the block 3, 'は' is directly outputted, while if the user moves his/her finger toward 'お' allocated to a closed sector in a right direction of the stationary block 402 without removing his/her finger from the block, 'あ' dan of 'は' gyo is outputted. At this time, the block body 401 is moved along with the touched finger 6H, and becomes in surface contact with an inner side 402a of the stationary block 402. In this state, if the user removes his/her finger 6H from the block body 10, 'ひ' that corresponds to 'あ' dan of 'は' gyo is inputted, and the block body 10 is returned to the center of the touch screen keyboard 100. In order to input another dan, as illustrated in FIG. 2, the user moves the block body 10 in a direction of the closed sector of the stationary block 5 to which the corresponding dan of the corresponding gyo is allocated in a state that the user's finger 6H touches the block body 10, and after the block body 10 becomes in surface contact with the stationary block 5, the user makes his/her finger free from the block body 10.

As illustrated in FIGS. 2 and 6A, the block body 10 becomes in surface contact with the stationary block in accordance with the moving manipulation of the block body 10 for inputting a character allocated to the stationary block 5. The block body 401, which has been touched by the user's finger 6H, is set to move only to a position where the outer sides 401a~401d of the block body become in surface contact with the inner sides 402a-402d of the stationary block 5. When the surface contact is made, the dan allocated to the stationary block 402 is converted into the dan that matches the gyo of the corresponding block 3 to be outputted, and as shown in the activated stationary block 402-1 as illustrated in FIG. 6B, the dan allocated to the stationary block 402 is converted into ' ゛ , ゜ , 小 'to be allocated (See the stationary block in FIG. 6B).

At this time, in order to combine the conversion symbols ' ゛ , ゜ , 小 'the user performs the touch manipulation by moving 401-1 his/her finger 6H to the activated stationary block 402-1 in a state that his/her finger is kept in a contact state without removing his/her finger from the block. Accordingly, only the user's finger 6H-1 is moved to the stationary block (See FIG. 6B) while the block body 401 stays in the stop position (See FIG. 6A).

In FIG. 6A, it is exemplified that the input of ' あ'dan and the combination of the activated block 402-1 ' ゛ 'are performed using the block 5 to which ' は 'is allocated. First, as illustrated in FIG. 6B, in order to input ' は 'the user makes ' ひ 'recognized by making the block body 401 in surface contact with the stationary block 402 to which the input function of ' あ'dan of the corresponding character (See FIG. 6A) in a state that the user's finger 6H-1 is touching the block 3 to which ' は 'is allocated. In this state, if the stationary block 402 is activated 402-1 and the dan is converted into ' ゛ '(See FIG. 6B), the user makes his/her finger 6H-1 enter into a closed sector 402-2, to which ' ゛ 'of the activated stationary block 402-1 is allocated, in a state that the touch of the user's finger is maintained, and then removes his/her finger from the closed sector 402-2 to input ' は '(See FIG. 6B).

As illustrated in the drawing, the Japanese keyboard 400 includes various kinds of function keys. 10 characters of ' あ'dan are allocated to a plurality of blocks 3 (five rows and three columns).

Then, the plurality of closed sectors of the stationary block 402 is divided into 10 sectors. Among them, four directions (here, upper, lower, left, and right directions) are arranged to input characters of ' あ'dan, ' う'dan, ' え'dan, and ' い'dan, and three divided diagonal closed sectors (here, upper left and upper right sectors: See FIG. 6A) are allocated with ' ゛ '(converted into a sonant), ' ゜ '(converted into a semi-sonant), and ' 小 '(converted into a small letter) to perform the conversion function of characters of ' あ'dan.

In the case of the conversion symbols allocated when the stationary block 402 is activated, as the stationary block 402 is activated 402-1 at a moment where the stationary block becomes in surface contact with the corresponding block body 401 that has been touched by the user's finger, the ten closed sectors are divided into 24 closed blocks to be allocated. The corresponding rule is as follows.

| Position | Stationary Block | Activated Stationary Block |
|---|---|---|
| Upper | Allocated with ' お' dan and long vowel symbol | Divided into 3 closed sectors and allocated with sonant, semi-sonant and small-letter symbols |
| Lower | Allocated with ' う' dan and rest symbol | Divided into 3 closed sectors and allocated with sonant, semi-sonant and small-letter symbols |
| Left | Allocated with ' え' dan | Divided into 3 closed sectors and allocated with sonant, semi-sonant and small-letter symbols |
| Right | Allocated with ' い' dan | Divided into 3 closed sectors and allocated with sonant, semi-sonant and small-letter symbols |
| Upper left | 3 closed sectors allocated with sonant, semi-sonant and small-letter symbols | 3 closed sectors allocated with sonant, semi-sonant and small-letter symbols |
| Upper right | 3 closed sectors allocated with sonant, semi-sonant and small-letter symbols | 3 closed sectors allocated with sonant, semi-sonant and small-letter symbols |
| Lower left | | Divided into 3 closed sectors and allocated with sonant, semi-sonant and small-letter symbols |
| Lower right | | Divided into 3 closed sectors and allocated with sonant, semi-sonant and small-letter symbols |

That is, in the case of a closed sector which is on the left of the stationary block 402 and to which ' え'dan is allocated, the closed sector is divided into three sectors when the stationary block 402 is activated 402-1, and the converted ' ゛ , ゜ , 小 'are allocated again to the respective closed sectors.

Of course, ' ゛ , ゜ , 小 'allocated in the upper left and upper right directions of the stationary block 402 are maintained as they are.

In order to display a character of ' あ'dan, the corresponding block 3 is once touched by the user's finger, while in order to display 'period', the corresponding block 3 is once touched by the user's finger. In the case of a 'Chinese character change', the block 3 and the closed sector of the block 3 are touched long, that is, for a specified time, the user's finger is removed from the block 3, and then the corresponding Chinese character is selected among the Chinese characters displayed on the display screen.

The conversion symbols ' ゛ , ゜ , 小 'allocated to the closed sectors in diagonal directions of the stationary block 402 are outputted in a manner that if both contact surfaces of the corresponding diagonal line are in a contact state even during 0.1 second (e.g., in the case of manipulation input of ' 小 'in the upper left direction, it is required that the contact of the sides 401a and 402a and the contact of the sides 401b and 402b are simultaneously performed) when the block body 401 becomes in surface contact with the stationary block 402, it is recognized as a diagonal conversion symbol, and then the user's finger is removed from the sector to output the corresponding symbol.

Also, in order to control the direction of a cursor displayed on the display unit 90 when the user inputs a character, a direction key positioned just below ' わ 'of the Japanese keyboard 400. For example, if the user moves the block body 401 downward in a state that the user's finger is touching the corresponding direction key, and then moves the block body 401 to the right in a state that the user's finger is touching the corresponding direction key, the cursor being displayed on the display unit 90 is moved to the right. In order to move the cursor to a desired position, the user maintains the manipulation state of the corresponding block until the cursor reaches the desired position.

On the other hand, it is preferable that the function keys of the Japanese keyboard 400 are arranged in consideration of effectiveness.

As described above, in inputting Japanese kana, the number of inputs is remarkably decreased in comparison to a conventional method, and thus the user's inconvenience in use can be greatly improved.

Although in communication terminals, there are cases in which a plurality of languages are allocated to one keypad so as to utilize at least two languages, the embodiment is described with reference to the block body allocated with one kind of language.

Next, the method for inputting characters/numerals for a communication terminal as constructed above according to an embodiment of the present invention will be described in detail with reference to FIGS. 9 to 12.

FIGS. 9 to 12 are flowcharts illustrating detailed processes of the method for inputting characters/numerals for a communication terminal according to an embodiment of the present invention.

First, the microprocessor 70 of the communication terminal P judges whether a user selects a character mode corresponding to the language by touching a character mode block provided on the block body 10. Then, if the user has selected the character mode corresponding to the language, the microprocessor 70 judges which mode of a Hangeul input mode, Roman character input mode, and a Japanese character input mode the user selects (step S100).

If the user selects the Hangeul input mode as a result of the judgment in the step S100, the microprocessor 70 detects a face junction manipulation signal of the stationary block 5 in accordance with a user's manipulation of a plurality of blocks 3 provided on the block body 10 or a block body 10 moving manipulation in upper, lower, left, right, and diagonal directions, inputted from the block manipulation recognition unit 20 and/or the stationary block manipulation recognition unit 30, combines a consonant and a vowel of a corresponding Hangeul and a numeral/symbol, and displays a corresponding Hangeul and numeral/symbol on a display screen of the display unit 90 (step S200).

More specifically, in accordance with the user's selection of the Hangeul input mode, the microprocessor 70 of the communication terminal P maintains a Hangeul input waiting state by changing the present mode to the Hangeul input mode, and then judges whether the corresponding user selects a menu of 'backspace', 'space', 'shift', or 'enter' by moving the block body 10 in upper, lower, left, or right direction after the user touches a menu block (step S210), as shown in FIG. 10.

If the corresponding user has manipulated the menu as a result of judgment, the microprocessor 70 performs the menu of 'backspace', 'space', 'shift', or 'enter' selected by the user, and then repeatedly performs the above-described step S210 and the following steps (step S211).

However, if the user has not selected the menu of 'backspace', 'space', 'shift', or 'enter' as a result of judgment in the step S210, the microprocessor 70 judges whether the plurality of blocks 3 provided on the block body 10 are manipulated by the user. If a specified block provided on the block body 10 is manipulated by the user, it judges whether a specified vowel allocated to the stationary block 5 in the respective moving directions is selected in accordance with manipulation of the block body 10 by the user (step S212).

If the user inputs a consonant or a vowel by performing face junction manipulation of the stationary block 5 by moving the plurality of blocks 3 provided on the block body 10 or the block body 10 in upper, lower, left, right, or diagonal direction as a result of judgment, the microprocessor 70 confirms the input of the consonant or single vowel inputted by the user based on a manipulation signal inputted from the block manipulation recognition unit 20 and/or stationary block manipulation recognition unit 30 (step S213).

If a specified vowel allocated to the stationary block in the respective moving directions is selected in accordance with the user's manipulation of the block body 10 as a result of judgment, the microprocessor 70 judges whether a specified block to which the consonant is allocated is re-selected by the user (step S214).

If the specified block to which the consonant is allocated is re-selected as a result of judgment, the microprocessor 70 combines the corresponding consonant with a diphthong (step S215), and judges whether the character according to the user's manipulation is a complete type Hangeul character. If the complete type Hangeul is possible, the microprocessor performs the above-described step S217 (step S216).

If the character according to the user's manipulation is not the complete type Hangeul character as a result of judgment in the step S216, the microprocessor 70 outputs the corresponding consonants only and performs the step S217 as the character inputted by the user is composed of the consonants only (step S218).

If the specified block 3 is not selected as a result of judgment in the step S216, the microprocessor judges whether the stationary block 5 activated in accordance with the user's manipulation of the block body 10 is selected (step S219). If the activated stationary block 5 is selected, the microprocessor recognizes the vowel allocated to the activated stationary block 5 in a moving direction of the block body 10, and then repeatedly performs the step S214 and the following steps. If the activated stationary block 5 is not selected, the microprocessor combines the corresponding consonant with the corresponding to vowel (step S220), and then repeatedly performs the step S216 and the following steps.

If the specified vowel of the stationary block 5 allocated in the respective moving directions is not selected in accordance with the user's manipulation of the block body 10 as a result of the above-described step S213, the microprocessor 70 judges whether the corresponding block 3 is manipulated long in accordance with the user's manipulation (step S221). If the corresponding block is manipulated long in accordance with the user's manipulation, the microprocessor recognizes the corresponding consonant as a fortis, and repeatedly performs the step S212 and the following steps (step S222).

If the corresponding block is not manipulated long as a result of judgment in the step S221, the microprocessor outputs the corresponding consonant to display it on the screen (step S217), and repeatedly performs the step S212 and the following steps.

On the other hand, if the user selects the Roman character input mode as a result of judgment in the step S100, the microprocessor 70 detects a face junction manipulation signal of the stationary block 5 in accordance with manipulation of the plurality of blocks 3 provided on the block body 10 inputted from the block manipulation recognition unit 20 and/or stationary block recognition unit 30 or moving manipulation of the block body 10 in upper, lower, left, right, and diagonal directions, combines consonants, vowels, and numerals/symbols of the corresponding Roman character, and displays the combined Roman character on the display screen 90 (step S300).

More specifically, in accordance with the user's selection of the Roman character input mode, the microprocessor 70 of the communication terminal P changes the present mode to the Roman character input mode, and then judges whether the user touches a menu manipulation to select the menu of 'delete, space bar, numeral/symbol input, or enter' by moving the block body in upper, lower, left and right directions (step S310), as shown in FIG. 11.

If the user selects the menu as a result of judgment, the microprocessor 70 performs the menu of 'delete, space bar, numeral/symbol input, or enter' selected by the user, and then repeatedly performs the step S310 and the following steps.

However, if the user does not select the menu of 'delete, space bar, numeral/symbol input, or enter' as a result of judgment in the step S310, the microprocessor 70 judges whether the users manipulates the plurality of blocks 8 provided on the block body 10. If the specified block provided on the block body 10 is manipulated by the user, the microprocessor judges whether the specified vowel allocated to the stationary block 5 in the respective directions is selected in accordance with the user's manipulation of the block body 10 (step S312).

If the user inputs a consonant or vowel by performing a face junction manipulation of the plurality of blocks 3 provided on the block body 10 and/or the stationary block 5 for moving the block body 10 in upper, lower, left, right and diagonal directions as a result of judgment, the microprocessor confirms the input of the consonant/vowel inputted by the user in response to a manipulation signal inputted from the block manipulation recognition unit 20 and/or stationary block manipulation recognition unit 30 (step S313).

If the specified vowel allocated to the stationary block 5 in the respective moving directions is selected in accordance with the user's manipulation of the block body 10 as a result of judgment, the microprocessor 70 judges whether the corresponding block is manipulated by the user long (step S314).

If the corresponding block is manipulated long as a result of judgment, the microprocessor 70 converts the present mode into a capital/small letter mode of the corresponding block (step S319), judges whether the activated stationary block 5 is selected in accordance with the user's manipulation of the stationary block 10, and performs the step S315 and the following steps. If the corresponding block is not manipulated long, the microprocessor 70 judges whether the activated stationary block 5 is selected (step S315), and recognizes the vowel allocated to the stationary block 5 activated in a moving direction of the block body 10. If the activated stationary block 5 is selected, the microprocessor combines the corresponding consonant with first and second vowels (step S318). If the activated stationary block 5 is not selected, the microprocessor combines the corresponding consonant and vowel (step S316), displays it on the screen (step S317), and performs the step S315.

If the specified vowel of the stationary block 5 allocated to the respective moving directions is not selected in accordance with the user's manipulation of the block body 10 as a result of judgment in the step S313, the microprocessor 70 judges whether the corresponding block 3 is manipulated long in accordance with the user's manipulation (step S320). If the corresponding block is manipulated long as a result of judgment, the microprocessor 70 converts the present mode into a capital/small letter mode of the corresponding block (step S321), and then repeatedly performs the step S321 and the following steps (step S321). If the corresponding block is not manipulated long, the microprocessor 70 outputs the corresponding Roman character and displays it on the screen (step S317), and repeatedly performs the step S312 and the following steps.

On the other hand, if the user selects the Japanese character input mode as a result of judgment in the above-described process S100, the microprocessor 70 detects a face junction manipulation signal of the stationary block 5 in accordance with the manipulation of the plurality of blocks provided on the block body 10 inputted from the block manipulation recognition unit 20 and/or stationary block manipulation recognition unit 30 or the moving manipulation of the block body 10 in upper, lower, left, right, and diagonal directions, combines consonants, vowels and numeral/symbol of the corresponding Roman character, and then displays it on the screen (step S400).

With reference to FIG. 12, in accordance with the user's selection of the Japanese character input mode, the microprocessor 70 of the communication terminal P converts the present mode to the Japanese character input mode to maintain the Japanese character input standby state. After the user touches the menu manipulation, the microprocessor judges whether the menu of 'delete, space bar, numeral/symbol input, or enter' is selected by moving the block body in upper, lower, left and right directions (step S410).

If the user manipulates the menu as a result of judgment, the microprocessor 70 performs the menu of 'delete, space bar, numeral/symbol input, or enter' selected by the user, and repeatedly performs the step S410 and the following steps (step S411).

However, if the user does not select the menu of 'delete, space bar, numeral/symbol input, or enter' as a result of judgment in the step S410, the microprocessor 70 judges whether the user manipulates the plurality of blocks 3 provided on the block body 10. If the specified block provided on the block body 10 is manipulated by the user, the microprocessor judges whether 'い'dan, 'う'dan, 'え'dan, 'あ'dan, and a transforming function symbol allocated to the stationary block 5 in the respective moving directions are selected in accordance with the user's manipulation (step S412).

If the Japanese is selected by performing the face junction manipulation of the plurality of blocks 3 provided on the block body 10 or the stationary block 5 through movement of the block body 10 in upper, lower, left, right and diagonal directions as a result of judgment, the microprocessor 70 confirms the input of the corresponding dan inputted by the corresponding user or the input of symbol combination into the 'あ'dan based on the manipulation signal inputted from the block manipulation cognition unit 20 and/or stationary block manipulation cognition unit 30 (step S413).

If the input of the corresponding dan allocated to the stationary block 5 in the respective moving directions and the input of symbol combination into the 'あ'dan are selected in accordance with the user's manipulation of the block body 10, the microprocessor 70 judges whether the corresponding block 5 is manipulated long by the user (step S414).

If the corresponding block is manipulated long as a result of judgment, the microprocessor 70 converts hiragana/katakana of the corresponding block into a Chinese character and recognizes it. After the Chinese character is selected by the touch manipulation of the user, the microprocessor judges whether the stationary block 5 activated by the user's manipulation of the block body 10 is selected (step S415), and then performs the step S415 and the following steps. If the corresponding block is not manipulated long, the microprocessor judges whether the activated stationary block 5 is not selected (step S415), and then recognizes the converting function symbol allocated to the stationary block 5 which is activated in the corresponding moving direction of the block body 10. If the activated stationary block 5 is selected, the microprocessor performs the converting function of the specified dan of the corresponding gyo (step S418). If the activated stationary block 5 is not selected, the microprocessor outputs the corresponding dan, performs the 'あ'dan converting function (step S416), displays it on the screen (step S417), and then performs the step S415.

If the input of the corresponding dan allocated to the stationary block 5 in the respective moving directions and the input of symbol combination into the 'あ'dan are not selected in accordance with the user's manipulation of the block body 10, the microprocessor 70 judges whether the corresponding block 3 is manipulated long by the user (step S420). If the corresponding block is manipulated long in accordance with the user's manipulation, the microprocessor 70 converts hiragana/katakana of the corresponding block into a Chinese character, selects the Chinese character in accordance with the user's touch manipulation, and repeatedly performs the step S413 and the following steps (step S421). If the corresponding block 3 is not manipulated long, the microprocessor outputs the corresponding Japanese and displays it on the screen (step S417), and repeatedly performs the step S412 and the following steps (step S422).

If the character input work through any one input mode selected among the Hangeul input mode, the Roman character input mode, and the Japanese input mode is finished as a result of judgment, the microprocessor 70 of the communication terminal P judges whether the user selects a manipulation signal to allow the corresponding user to store the character (step S500).

If the corresponding user selects a storage block for character storage as a result of judgment, the microprocessor 70 stores the characters inputted by the user (step S600). If the corresponding user does not select the storage block for character storage, the microprocessor 70 judges whether the user completes the character mode, and then continues or release the character mode (step S700).

FIGS. 13A to 13D are views a using state of a Japanese keyboard for a character/symbol input device of a communication terminal according to the present invention. The apparatus of the present invention will now be described with reference to FIG. 13.

A rectangular portion having a cavity therein positioned on the outside of the frame displayed on the screen shown in FIG. 13 is the stationary block 5. The stationary block 5 has a constant thickness, and the interior of the stationary block 5 is represented as an empty so that the block body 10 is positioned in the inside and then is moved by the user's manipulation. Also, the stationary block 5 itself is partitioned into some closed sectors of a constant area, to which consonants or vowels of Hangeul, Roman character or Japanese are allocated. In the embodiment shown in FIG. 13, the stationary block 5 is divided into 6 closed sectors to which necessary Japanese characters are allocated. The stationary block 5 may be divided into proper numbers in accordance with user's needs. The term 'closed sector' used herein means that a section of a certain dimension divided from the stationary block 5 and block body 10 is allocated to a character.

The block body 5 shown in FIG. 13 is a rectangular input unit positioned in the stationary block 5, and a portion which is moved in a sliding direction of a user to touch the stationary block 5 and output the character is the block body 5, with the portion being touched by a user's finger. The block body 10 also is divided into some blocks of a desired dimension, in which a certain character is allocated to the respective divided blocks so that each block is inputted by a character in accordance with the user's manipulation. Also, in case the user selects a character by pressing a specified block on the block body 10, the block body 10 is dragged and moved to the stationary block 5 in accordance with the user's manipulation. The selection, moving and position judgment of the block body 10 employ the widely known technology related to the selection and drag of a figure object to the displayed on the touch screen, the detailed description being omitted herein.

Figure 13A:
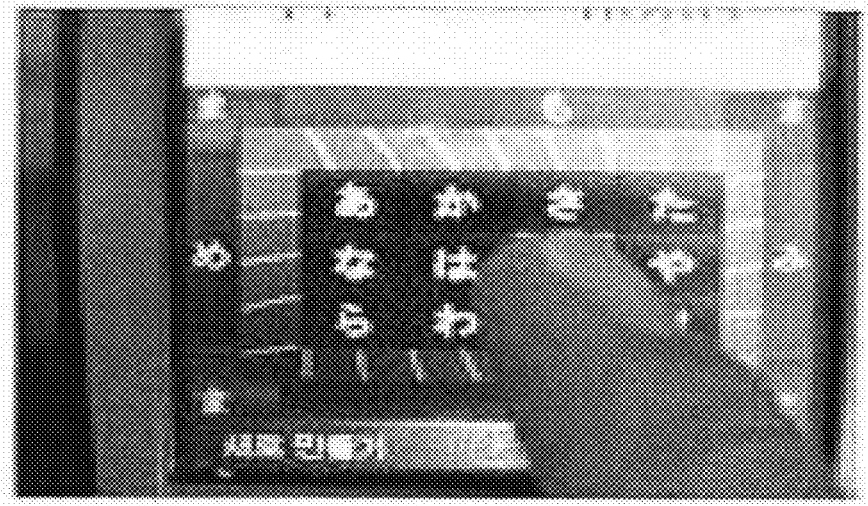
Figure 13B:
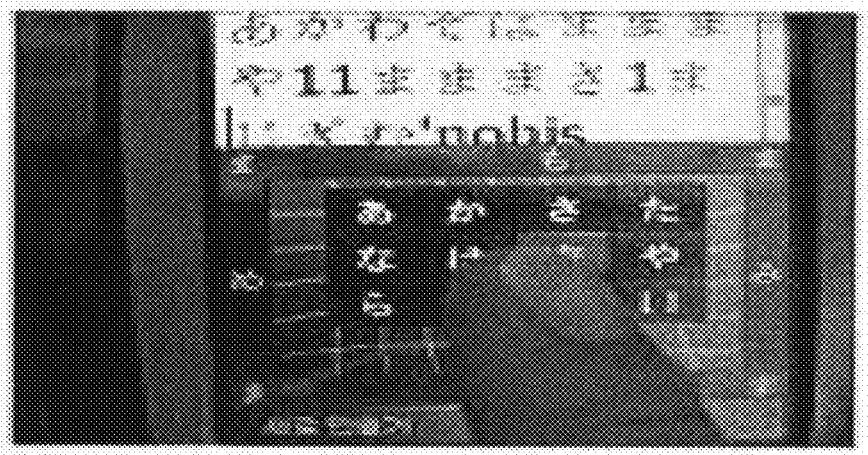
Figure 13C:
Figure 13D:
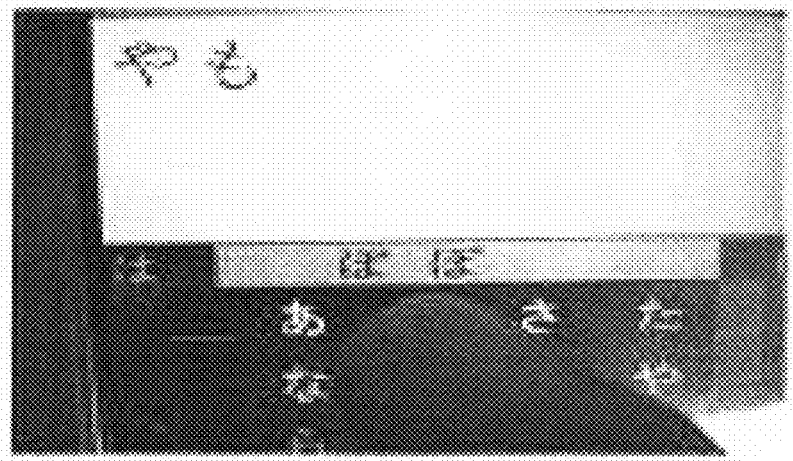

FIG. 13A is a photograph depicting the state immediately prior to the sliding manipulation, and shows the user selects a specified character of the block body displayed on the touch portion of the touch screen. In case the specified portion of the block body is selected by the user's manipulation, the block body can be dragged (slid). FIG. 13B is a photograph showing that the block body is slid in a north direction (upper end) in accordance with the user's manipulation, in which a central block body is slid in a north direction along a touched finger. FIG. 13C is a photograph showing that the block body is in surface contact with the upper stationary block in accordance with the user's manipulation, and the corresponding upper stationary block is activated. FIG. 13D is a photograph showing that a specified closed sector of the stationary block is selected in accordance with the selection of the specified block and the sliding of the block body through the user to display the character desired by the user on the screen. The user can put the desired characters conveniently through the above process shown in FIGS. 13A to 13B.

INDUSTRIAL APPLICABILITY

As described above, according to the apparatus and method for inputting characters/numerals for a communication terminal according to the present invention, consonants/vowels of characters are arranged on the respective blocks and stationary blocks on the block body on the touch part provided in the communication terminal so that a user can be well acquainted with such an arrangement. Accordingly, the input of characters and numerals/symbols for each language can be conveniently made with a plurality of active blocks that are generated by touch signals on the respective blocks, and a user can promptly and conveniently input various kinds of characters/numerals of Hangeul, Roman characters, and Japanese with a smaller number of inputs or manipulations than the communication terminal provided with the existing touch screen type keyboard, so that the apparatus and method according to the present invention can contribute to the substantial spread of communication terminals adopting touch screen key input devices. Also, since the apparatus and method according to the present invention makes it possible to input characters/numerals more promptly and conveniently, it is effective in implementing document works, e-mail, chatting, Internet information search, and the like.

While this invention has been described in connection with what is presently considered to be the most practical and preferred embodiments, it is to be understood that the invention is not limited to the disclosed embodiment and the drawings. On the contrary, it is intended to cover various modifications and variations within the spirit and scope of the appended claims.

LEGENDS IN DRAWINGS

FIG. 1
FIG. 2
상 :Upper
하 :Lower
좌 :Left
우 :Right
좌상 :Upper left
우상 :Upper right
좌하 :Lower left
우하 :Lower right
FIG. 3
10: Block Body
20: Block Manipulation Recognition Unit
30: Stationary Block Manipulation Recognition Unit
40: Character Storage Unit
50: Program Memory
60: Code Storage Unit
70: Microprocessor
80: Display Drive Unit
90: Display Unit
FIG. 4A
FIG. 4B
FIG. 5
FIG. 5B
FIG. 6A
FIG. 6B
FIG. 7A, FIG. 7B
블록 조작후 고정블록 입력 예시
Example of stationary block input after manipulation of block
블록 조작과 고정블록 조작후 활성된 고정 블록 입력예시
Example of activated stationary block input after manipulation of block and stationary block
블록 :Block
고정블록 :Stationary Block
활성고정블록 :Activated Stationary Block
소문자 :Small letter
탁음 :Sonant
촉음 :Interval Geminate
행 :gyo
단 :dan
FIG. 8
FIG. 9
Start
S100: Character mode selected?
No, Yes
S200: Hangeul input mode routine
S300: Roman character input mode routine
S400: Japanese input mode routine
S500: Storage key signal inputted?
No, Yes
S600: Store characters inputted by user
S700: Character mode ended?
No, Yes
End
FIG. 10
한글입력모드 :Hangeul input mode
S210: Menu manipulation region selected?
No, Yes
S211: Perform 'delete', numeral/symbol input, 'enter', and the like according to menu selected by user
S212: Specified block manipulated?
S213: Stationary block manipulated?
S214: Specified block manipulated?
S215: Combine corresponding consonant with vowel
S216: Complete Hangeul possible?
No, Yes
S218: Output consonant only if consonant is inputted only
S219: Activated stationary block manipulated?
No, Yes
S220: Combine corresponding consonant with vowel
S221: Block manipulated long?
Yes, No
S222: Recognize corresponding fortis
복귀 :Return
FIG. 11
Roman character input mode
S310: Menu manipulation region selected?
No, Yes
S311: Perform 'delete', numeral/symbol input, 'enter', and the like according to menu selected by user
S312: Specified block manipulated?
S313: Stationary block manipulated?
S314: Corresponding block manipulated long?
S315: Activated stationary block manipulated?
S315: Combine corresponding consonant with primary vowel
S317: Output it on screen
S318: Combine corresponding consonant with primary and secondary vowels
S319: Convert large/small letter mode
S320: Block manipulated long?
S321: Convert large/small letter mode
S322: Output corresponding Roman character
복귀 :Return
FIG. 11
Japanese input mode
S410: Menu manipulation region selected?
No, Yes
S411: Perform 'delete', numeral/symbol input, 'enter', and the like according to menu selected by user
S412: Specified block manipulated?
S413: Stationary block manipulated?
S414: Corresponding block manipulated long?
S415: Activated stationary block manipulated?
S416, S418: Output corresponding Japanese
S418: Output it on screen
S420: Block manipulated long?
S419, S421, S422: Output corresponding Chinese character
복귀 :Return
FIG. 13A
FIG. 13B
FIG. 13C
FIG. 13D

The invention claimed is:

1. An apparatus for inputting characters/numerals for a communication terminal provided with a touch screen keyboard on a touch part, through which designation of coordinates or selection of characters can be performed using a finger or a tool for communications with an outside or data storage, the apparatus comprising:

a block body positioned in the touch screen keyboard for generating a manipulation signal of a stationary block in accordance with a block manipulation of a user who desires a character/numeral input or a moving manipulation in at least four directions based on a center of a user, the block body including a plurality of blocks and a plurality of closed sectors of the stationary block positioned in at least four directions, in which the block body is moved, being allocated with consonants, vowels, numerals, symbols, and function keys by languages including Hangeul, Roman characters, and Japanese;

a character storage unit storing character data by languages used in the character input apparatus;

a program memory storing an inner operating program of the communication terminal;

a code storage unit storing code data corresponding to the blocks provided on the block body and the stationary block positioned on an outside of the block body;

a block manipulation recognition unit detecting a touch manipulation state of each block provided on the block body;

a stationary block recognition unit detecting a manipulation state of the stationary block in accordance with a moving manipulation of the block body in at least four directions;

a microprocessor judging of which language a user inputs a phoneme with reference to the character data stored in the character storage unit in accordance with the operating program stored in the program memory when a touch manipulation state detection signal is inputted through the block or stationary block manipulation recognition unit, and generating and outputting a display control signal for displaying phonemes of the corresponding language inputted by the user with reference to the code data stored in the code storage unit;

a display drive unit outputting a drive control signal for displaying the character and numeral selected by the user through manipulation of the stationary block in accordance with the moving manipulation of the block body or the block on the block body, in accordance with the display control signal outputted from the microprocessor; and a display unit displaying the character and the numeral in accordance with the drive control signal outputted from the display drive unit;

wherein the stationary block and the block body are logically implemented and are displayed on the touch part of the touch screen.

2. The apparatus of claim 1, wherein if the block body is a Hangeul block body, each block provided on the block body is allocated with a consonant, and the stationary block in at least four directions, on which the block body is movable, is allocated with a vowel.

3. The apparatus of claim 2, wherein the stationary block in at least four directions, in which the block body is movable, is divided into 8 closed sectors, and the vowels allocated to the closed sectors include 'ㅣ, ㅗ, ㅛ, ㅓ, ㅏ, ㅟ, ㅜ, and ㅡ' allocated to upper, lower, left, right, upper left, upper right, lower left, and lower right sectors based on a center.

4. The apparatus of claim 2, wherein except for the vowels allocated to the stationary block in at least four directions, in which the block body is movable, vowels are converted into diphthongs when the stationary block is activated and divided into a plurality of closed sectors at the moment where the block body is in surface contact with the stationary block.

5. The apparatus of claim 3, wherein the stationary block having 8 closed sectors is divided into 14 closed sectors upon activation, and in the diphthong allocated to the closed sector of the activated stationary block including the upper, lower, left, right, upper left, upper right, lower left, and lower right sectors based on the center, 'ㅢ' is allocated to a closed sector allocated with 'ㅣ', a closed sector allocated with 'ㅗ' is divided into two parts each allocated with 'ㅛ, ㅚ', a closed sector allocated with 'ㅛ' is allocated with 'ㅙ', a closed sector allocated with 'ㅓ' is divided into 3 parts each allocated with 'ㅕ, ㅖ, ㅔ', a closed sector allocated with 'ㅏ' is divided into 3 parts each allocated with 'ㅑ, ㅒ, ㅐ', a closed sector allocated with 'ㅟ' is allocated with 'ㅝ', a closed sector allocated with 'ㅜ' is divided into 2 parts each allocated with 'ㅠ, ㅟ', and a closed sector allocated with 'ㅡ' is allocated with 'ㆆ'.

6. The apparatus of claim 2, wherein in combination of Hangeul allocated to each block provided on the Hangeul block body, the stationary block in at least four directions, in which the block body is movable, and the activated stationary block, a consonant is outputted by touching each block provided on the block body once at short using a user's tool or finger and then removing the tool or finger from the block;

in a state where the user's tool or finger is touching each block provided on the block body, the block body is moved along the tool or finger towards the vowel allocated to the closed sector of the stationary block, and an outside of the block body is in surface contact with the stationary block and then is stopped; and if the tool or finger is removed from the block, the consonant allocated to the corresponding block and the vowel allocated to the stationary block in the moving direction of the corresponding block body are combined and inputted, and the block body is returned to a center of the keyboard; and in a state where the user's tool or finger is touching the block body which is stopped when the block body is in surface contact with the stationary block, the stop state of the block body is maintained in the closed sector of the activated stationary block which is converted when the block body is in surface contact with the stationary block; and if the block body is moved by using the tool or finger and then the tool or finger is removed from the block body, the diphthong allocated to the activated stationary block is inputted, and the block body is returned to the center of the touch screen keyboard.

7. The apparatus of claim 1, wherein if the block body is a Roman character block body, each block provided on the block body is allocated with a consonant, and the stationary block in at least four directions, on which the block body is movable, is allocated with a vowel.

8. The apparatus of claim 2, wherein a secondary vowel to be combined with a vowel allocated to the stationary block in at least four directions, in which the block body is movable, is allocated when the stationary block is activated and divided into a plurality of closed sectors at the moment where the block body is in surface contact with the stationary block.

9. The apparatus of claim 2, wherein each block provided on the block body is allocated with a consonant comprising 'B, C, D, F, G, H, J, K, L, M, N, P, Q, R, S, T, V, X, Z, CH, PH, SH, and TH' and a vowel output direction key; and the stationary block in at least four directions, in which the block body is movable, is divided into 8 closed sectors, and the vowels allocated to the closed sectors include 'I, O, U, E, W, A, NG and Y' allocated to upper, lower, left, right, upper left, upper right, lower left, and lower right sectors based on a center.

10. The apparatus of claim 2, wherein the stationary block of 8 closed sectors is divided into 40 closed sectors when the stationary block is activated, and secondary vowels allocated to the activated closed block include 'A, E, I, O and U' while the closed sector allocated to upper, lower, left, right, upper left, upper right, lower left, and lower right sectors is divided into 5 sectors.

11. The apparatus of claim 7, wherein in combination of Roman character allocated to each block provided on the Roman character block body, the stationary block in at least four directions, in which the block body is movable, and the activated stationary block, a consonant is outputted by touching each block provided on the block body once at short using a user's tool or finger and then removing the tool or finger from the block;

in a state where the user's tool or finger is touching each block provided on the block body, the block body is moved along the tool or finger towards the vowel allocated to the closed sector of the stationary block, and an outside of the block body is in surface contact with an inside of the stationary block and then stopped; and if the tool or finger is removed from the block, the consonant allocated to the corresponding block and the vowel allocated to the stationary block in the moving direction of the corresponding block body is combined and inputted, and the block body is returned to a center of the keyboard; and in a state where the user's tool or finger is touching the block body which is stopped when block body is in surface contact with the stationary block, the stop state of the block body is maintained in the closed sector of the activated stationary block which is converted when the block body is in surface contact with the stationary block; if the block body is moved by using the tool or finger and then the tool or finger is removed from the block body, a consonant allocated to the corresponding block, a vowel of the stationary block and the secondary vowel allocated to the activated stationary block are combined and inputted; and in the case of a vowel output direction key allocated to the corresponding block, the vowel of the stationary block and the secondary vowel allocated to the activated stationary block are combined and inputted, and the block body is returned to the center of the touch screen keyboard.

12. The apparatus of claim 1, wherein if the block body is a Japanese block body, 'あ'-dan characters of each gyo of Japanese are allocated to each block provided on the block body, and characters 'い'dan, 'え'dan, 'え'dan, 'あ'dan and a conversion function symbol are allocated to the stationary block in at least four directions, in which the block body is movable.

13. The apparatus of claim 12, wherein the stationary block in at least four directions, in which the block body is movable, is divided into 10 closed sectors, and the Japanese and the conversion function symbols are allocated to the closed sectors in a manner that a sonant symbol, a semi-sonant symbol, a small letter symbol, 'あ'dan of each gyo, a prolonged sound symbol, 'え'dan of each gyo, 'え'dan of each gyo, 'う'dan of each gyo, and a rest symbol are allocated to upper right, upper, upper left, left, right, and lower sectors.

14. The apparatus of claim 13, wherein if the stationary block of 10 closed sectors is activated, the upper left, upper, upper right, left, right, lower left, left and lower right closed sectors are divided into 24 closed sectors, and in the conversion function symbol allocated to the activated closed sectors, a sonant symbol, a semi-sonant symbol, and a small letter symbol are allocated to the closed sectors.

15. The apparatus of claim 12, wherein in combination of Japanese allocated to each block provided on the Japanese block body, the stationary block in at least four directions, in which the block body is movable, and the activated stationary block, a 'あ'dan of each gyo is outputted by touching each block provided on the block body once at short using a user's tool or finger and then removing the tool or finger from the block;

in a state where the user's tool or finger is touching each block provided on the block body, the block body is moved along the tool or finger towards the 'う'dan, 'え'dan, 'え'dan, 'あ'dan and conversion function symbol of each gyo allocated to the closed sector of the stationary block, and an outside of the block body is in surface contact with an inside of the stationary block and then stopped; and if the tool or finger is removed from the block, the 'え'dan, 'う'dan, 'え'dan, 'あ'dan and a conversion function symbol of each gyo allocated to the corresponding block and the vowel allocated to the stationary block in the moving direction of the corresponding block body are combined and inputted, and the block body is returned to a center of the keyboard; and in a state where the user's tool or finger is touching the block body which is stopped when the block body is in surface contact with the stationary block, the stop state of the block body is maintained in the closed sector of the activated stationary block which is converted when the block body is in surface contact with the stationary block; and if the block body is moved by using the tool or finger and then the tool or finger is removed from the block body, the 'え'dan, 'う'dan, 'え'dan, 'あ'dan and a conversion function symbol of each gyo allocated to the activated stationary block are inputted, and the block body is returned to the center of the touch screen keyboard.

16. The apparatus of claim 1, wherein the output of the character and the conversion key allocated to the closed sector in a diagonal direction based on a center of the stationary block recognizes the state in which both contact surfaces of the corresponding diagonal line are in a contact state even during 0.1 second, as a manipulation signal of the character or conversion key allocated to the closed sector in a diagonal direction, when the block body is in surface contact with the stationary block; and if a finger is removed from the block body, the character allocated to the closed sector of the stationary block in the corresponding diagonal direction is outputted, and the block body is returned to a center of the touch screen keyboard.

17. The apparatus of claim 1, wherein fortes of 'ㄲ, ㄸ, ㅃ, ㅆ, and ㅉ' using each consonant provided on the Hangeul block body are outputted by touching 'ㄱ, ㄷ, ㅂ, ㅅ, and ㅈ' of the blocks allocated to the block body using a user's tool or finger;

large/small letter conversion of Roman characters provided on the Roman character block body and stationary body is outputted by touching the corresponding block allocated on the block body and the closed sector of the corresponding stationary block using the user's tool or finger during a desired time; and Chinese conversion of Japanese characters provided on the Japanese block body and stationary body is outputted by touching the corresponding block allocated on the block body and the closed sector of the corresponding stationary block using the user's tool or finger during a desired time, removing from it, and then selecting one of corresponding Chinese characters displayed on the screen.

18. A method for inputting characters/numerals for a communication terminal, comprising:

(1) a microprocessor of the communication terminal judging whether a user selects a character mode corresponding to a language;

(2) the microprocessor judging which mode of a Hangeul input mode, Roman character input mode, and a Japanese character input mode the user selects;

(3) if the user selects the Hangeul input mode, the microprocessor detecting a manipulation signal of a stationary block in accordance with a user's manipulation of a plurality of blocks provided on a block body or a block body moving manipulation in upper, lower, left, right, and diagonal directions, inputted from a block manipulation recognition unit and/or a stationary block manipulation recognition unit, combining a consonant and a vowel of a corresponding Hangeul and a numeral/symbol, and displaying a corresponding Hangeul and numeral/symbol on a display screen of the communication terminal;

(4) if the user selects the Roman character input mode, the microprocessor detecting a manipulation signal of a stationary block in accordance with a user's manipulation of a plurality of blocks provided on a block body or a block body moving manipulation in upper, lower, left, right, and diagonal directions, inputted from a block manipulation recognition unit and/or a stationary block manipulation recognition unit, combining a consonant and a vowel of a corresponding Roman character and a numeral/symbol, and displaying a corresponding Roman character and numeral/symbol on a display screen of the communication terminal;

(5) if the user selects the Japanese input mode, the microprocessor detecting a manipulation signal of a stationary block in accordance with a user's manipulation of a plurality of blocks provided on a block body or a block body moving manipulation in upper, lower, left, right, and diagonal directions, inputted from a block manipulation recognition unit and/or a stationary block manipulation recognition unit, combining hiragana, katakana, a Chinese character and a numeral/symbol, and displaying it on a display screen of the communication terminal;

(6) if a character input work through any one input mode selected among the Hangeul input mode, the Roman character input mode, and the Japanese input mode is finished, the microprocessor of the communication terminal judging whether the user selects a character storage and storing the character inputted by the user; and (7) the microprocessor of the communication terminal judging whether the user ends the character mode, and continuing or removing the character mode.

19. The method of claim 18, wherein the step (3) comprises:

(3-1) if the user selects the Hangeul input mode as a result of judgment in the step (2), the microprocessor of the communication terminal maintaining a Hangeul input waiting state by changing the present mode to the Hangeul input mode, and then judging whether the corresponding user selects a menu of 'backspace', 'space', 'shift', or 'enter' by moving the block body in upper, lower, left, or right direction after the user touches a menu block;

(3-2) if the corresponding user has manipulated the menu as a result of judgment in the step (3-1), the microprocessor performing the menu of 'backspace', 'space', 'shift', or 'enter' selected by the user, and then repeatedly performing the step (3-1) and following steps;

(3-3) if the user has not selected the menu of 'backspace', 'space', 'shift', or 'enter' as a result of judgment in the step (3-1), the microprocessor judging whether the plurality of blocks provided on the block body are manipulated by the user, and if a specified block provided on the block body is manipulated by the user, the microprocessor judging whether a specified vowel allocated to the stationary block in the respective moving directions is selected in accordance with manipulation of the block body by the user;

(3-4) if the user inputs a consonant or a vowel by performing face junction manipulation of the stationary block by moving the plurality of blocks provided on the block body or the block body in upper, lower, left, right, or diagonal direction as a result of judgment in the step (3-3), the microprocessor confirming the input of the consonant or single vowel inputted by the user based on a manipulation signal inputted from the block manipulation recognition unit and/or stationary block manipulation recognition unit;

(3-5) if a specified vowel allocated to the stationary block in the respective moving directions is selected in accordance with the user's manipulation of the block body as a result of judgment in the step (3-4), the microprocessor judging whether a specified block to which the consonant is allocated is re-selected by the user;

(3-6) if the specified block to which the consonant is allocated is re-selected as a result of judgment in the step (3-5), the microprocessor combines the corresponding consonant with a diphthong, judging whether the character according to the user's manipulation is a complete type Hangeul character, and if the complete type Hangeul is possible, displaying it on the screen;

(3-7) if the character according to the user's manipulation is not the complete type Hangeul character as a result of judgment in the step (3-6), the microprocessor outputting the corresponding consonants only and displaying it on the screen;

(3-8) if the specified block is not selected as a result of judgment in the step (3-6), the microprocessor judging whether the stationary block activated in accordance with the user's manipulation of the block body is selected;

(3-9) if the activated stationary block is selected, the microprocessor recognizing the vowel allocated to the activated stationary block in a moving direction of the block body, and then repeatedly performing the step (3-5) and the following steps;

(3-10) if the activated stationary block is not selected, the microprocessor combining the corresponding consonant with the corresponding to vowel, and then repeatedly performing the step (3-6) and the following steps;

(3-11) if the specified vowel of the stationary block allocated to the respective moving directions is not selected in accordance with the user's manipulation of the block body as a result of the step (3-4), the microprocessor judging whether the corresponding block is manipulated long in accordance with the user's manipulation;

(3-12) if the corresponding block is manipulated long in accordance with the user's manipulation, the microprocessor recognizing the corresponding consonant as a fortis, and repeatedly performing the step (3-3) and the following steps; and (3-13) if the corresponding block is not manipulated long as a result of judgment in the step (3-11), the microprocessor outputting the corresponding consonant to display it on the screen, and repeatedly performing the step (3-3) and the following steps.

20. The method of claim 18, wherein the step (4) comprises:

(4-1) if the user selects the Roman character input mode as a result of judgment in the step (2), the microprocessor of the communication terminal changing the present mode to the Roman character input mode, and then judging whether the user touches a menu manipulation to select the menu of 'delete, space bar, numeral/symbol input, or enter' by moving the block body in upper, lower, left and right directions;

(4-2) if the user selects the menu as a result of judgment in the step (4-1), the microprocessor performing the menu of 'delete, space bar, numeral/symbol input, or enter' selected by the user, and then repeatedly performing the step (4-1) and the following steps;

(4-3) if the user does not select the menu of 'delete, space bar, numeral/symbol input, or enter' as a result of judgment in the step (4-1), the microprocessor judging whether the users manipulates the plurality of blocks provided on the block body, and if the specified block provided on the block body is manipulated by the user, the microprocessor judging whether the specified vowel allocated to the stationary block in the respective directions is selected in accordance with the user's manipulation of the block body;

(4-4) if the user inputs a consonant or vowel by performing a face junction manipulation of the plurality of blocks provided on the block body and/or the stationary block for moving the block body in upper, lower, left, right and diagonal directions as a result of judgment in the step (4-3), the microprocessor confirming the input of the consonant/vowel inputted by the user in response to a manipulation signal inputted from the block manipulation recognition unit and/or stationary block manipulation recognition unit;

(4-5) if the specified vowel allocated to the stationary block of the respective moving directions is selected in accordance with the user's manipulation of the block body as a result of judgment in the step (4-4), the microprocessor judging whether the corresponding block is manipulated by the user long;

(4-6) if the corresponding block is manipulated long as a result of judgment in the step (4-5), the microprocessor converting the present mode into a capital/small letter mode of the corresponding block, and judging whether the activated stationary block is selected in accordance with the user's manipulation of the stationary block;

(4-7) if the corresponding block is not manipulated long as a result of judgment in the step (4-5), the microprocessor judging whether the activated stationary block is selected;

(4-8) the microprocessor recognizing the vowel allocated to the stationary block activated in a moving direction of the block body, and if the activated stationary block is selected, the microprocessor combining the corresponding consonant with first and second vowels;

(4-9) if the activated stationary block is not selected as a result of judgment in the step (4-7), the microprocessor combining the corresponding consonant and vowel, and displaying it on the screen;

(4-10) if the specified vowel of the stationary block allocated to the respective moving directions is not selected in accordance with the user's manipulation of the block body as a result of judgment in the step (4-4), the microprocessor judging whether the corresponding block is manipulated long in accordance with the user's manipulation;

(4-11) if the corresponding block is manipulated long as a result of judgment in the step (4-10), the microprocessor converting the present mode into a capital/small letter mode of the corresponding block, and then repeatedly performing the step (4-4) and the following steps; and (4-12) if the corresponding block is not manipulated long, the microprocessor outputting the corresponding Roman character, displaying it on the screen, and repeatedly performing the step (4-3) and the following steps.

21. The method of claim 18, wherein the step (5) comprises:

(5-1) if the user selects the Japanese character input mode as a result of judgment in the step (2), the microprocessor of the communication terminal converting the present mode to the Japanese character input mode to maintain the Japanese character input standby state, and after the user touches the menu manipulation, the microprocessor judging whether the menu of 'delete, space bar, numeral/symbol input, or enter' is selected by moving the block body in upper, lower, left and right directions;

(5-2) if the user manipulates the menu as a result of judgment in the step (5-1), the microprocessor performing the menu of 'delete, space bar, numeral/symbol input, or enter' selected by the user, and repeatedly performing the step (5-1) and the following steps;

(5-3) if the user does not select the menu of 'delete, space bar, numeral/symbol input, or enter' as a result of judgment in the step (5-1), the microprocessor judging whether the user manipulates the plurality of blocks provided on the block body, and if the specified block provided on the block body is manipulated by the user, the microprocessor judging whether 'い'dan, 'う'dan, 'え'dan, 'あ'dan, and a transforming function symbol allocated to the stationary block of the respective moving directions are selected in accordance with the user's manipulation;

(5-4) if the Japanese is selected by performing the face junction manipulation of the plurality of blocks provided on the block body or the stationary block through movement of the block body in upper, lower, left, right and diagonal directions as a result of judgment in the step (5-3), the microprocessor confirming the input of the corresponding dan inputted by the corresponding user or the input of symbol combination into the 'あ'dan based on the manipulation signal inputted from the block manipulation cognition unit and/or stationary block manipulation cognition unit;

(5-5) if the input of the corresponding dan allocated to the stationary block in the respective moving directions and the input of symbol combination into the 'あ'dan are selected in accordance with the user's manipulation of the block body as a result of judgment in the step (5-4), the microprocessor judging whether the corresponding block is manipulated long by the user;

(5-6) if the corresponding block is manipulated long as a result of judgment in the step (5-5), the microprocessor converting hiragana/katakana of the corresponding block into a Chinese character and recognizes it, and after the Chinese character is selected by the touch manipulation of the user, the microprocessor judging whether the stationary block activated by the user's manipulation of the block body is selected;

(5-7) if the corresponding block is not manipulated long as a result of judgment in the step (5-5), the microprocessor judging whether the activated stationary block is not selected;

(5-8) the microprocessor recognizing the converting function symbol allocated to the stationary block which is activated in the corresponding moving direction of the block body, and if the activated stationary block is selected, the microprocessor performing the converting function of the specified dan of the corresponding gyo;

(5-9) if the activated stationary block is not selected, the microprocessor outputting the corresponding dan, performing the 'あ'dan converting function, and displaying it on the screen;

(5-10) if the input of the corresponding dan allocated to the stationary block in the respective moving directions and the input of symbol combination into the 'あ'dan are not selected in accordance with the user's manipulation of the block body as a result of judgment in the step (5-4), the microprocessor judging whether the corresponding block is manipulated long by the user;

(5-11) if the corresponding block is manipulated long in accordance with the user's manipulation, the microprocessor converting hiragana/katakana of the corresponding block into a Chinese character, selecting the Chinese character in accordance with the user's touch manipulation, and repeatedly performing the step 5-4 and the following steps; and (5-12) if the corresponding block is not manipulated long, the microprocessor outputting the corresponding Japanese, displaying it on the screen, and repeatedly performing the step (5-3) and the following steps.

* * * * *